United States Patent
Crenshaw

(10) Patent No.: US 12,179,416 B2
(45) Date of Patent: Dec. 31, 2024

(54) MANUFACTURING SYSTEMS AND METHODS FOR THREE-DIMENSIONAL PRINTING

(71) Applicant: DC Precision Ceramics, LLC, Gilbert, AZ (US)

(72) Inventor: David Crenshaw, Gilbert, AZ (US)

(73) Assignee: DC Precision Ceramics, LLC

( * ) Notice: Subject to any disclaimer, the term of this patent is extended or adjusted under 35 U.S.C. 154(b) by 0 days.

(21) Appl. No.: 17/420,643

(22) PCT Filed: Jun. 4, 2021

(86) PCT No.: PCT/US2021/035982
§ 371 (c)(1),
(2) Date: Jul. 2, 2021

(87) PCT Pub. No.: WO2021/248057
PCT Pub. Date: Dec. 9, 2021

(65) Prior Publication Data
US 2023/0150186 A1    May 18, 2023

Related U.S. Application Data

(60) Provisional application No. 63/035,335, filed on Jun. 5, 2020.

(51) Int. Cl.
*B29C 64/209* (2017.01)
*B29C 64/118* (2017.01)
(Continued)

(52) U.S. Cl.
CPC .......... *B29C 64/118* (2017.08); *B29C 64/194* (2017.08); *B29C 64/209* (2017.08);
(Continued)

(58) Field of Classification Search
CPC ..... B29C 64/209; B29C 64/25; B29C 64/295; B29C 64/194; B29C 64/118
See application file for complete search history.

(56) References Cited

U.S. PATENT DOCUMENTS

| | | | |
|---|---|---|---|
| 10,112,202 B1 | 10/2018 | Dichter et al. | |
| 10,532,512 B2 | 1/2020 | Susnjara et al. | |

(Continued)

FOREIGN PATENT DOCUMENTS

| | | | |
|---|---|---|---|
| CN | 104708822 B | | 4/2017 |
| CN | 208946686 | * | 6/2019 |

OTHER PUBLICATIONS

Mixers (Year: 2011).*

(Continued)

*Primary Examiner* — S. Behrooz Ghorishi
*Assistant Examiner* — Alexander A Wang
(74) *Attorney, Agent, or Firm* — SNELL & WILMER L.L.P.

(57) ABSTRACT

A three-dimensional (3D) printing system may comprise a frame; and an additive component(s) configured to couple to the frame. The additive component(s) may comprise a first extrusion unit, a second extrusion unit, and/or a third extrusion unit. The 3D printing system may be a portion of a hybrid computer numerical control (CNC) machining/3D printing system and configured to manufacture a 3D component autonomously from start to finish. The additive component(s) may comprise a heating system including a hot-air blower.

19 Claims, 16 Drawing Sheets

(51) Int. Cl.
*B29C 64/194* (2017.01)
*B29C 64/295* (2017.01)
*B33Y 10/00* (2015.01)
*B33Y 30/00* (2015.01)
*B33Y 50/02* (2015.01)

(52) U.S. Cl.
CPC ............ *B29C 64/295* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,933,586 | B2 | 3/2021 | Susnjara et al. |
| 2015/0331412 | A1* | 11/2015 | Adair ................. B29C 64/209 700/126 |
| 2016/0185050 | A1 | 6/2016 | Topolkaraev et al. |
| 2017/0129180 | A1 | 5/2017 | Coates et al. |
| 2017/0334137 | A1 | 11/2017 | Nystrom et al. |
| 2018/0081343 | A1 | 3/2018 | Adair et al. |
| 2018/0117822 | A1 | 5/2018 | McGee et al. |
| 2018/0154440 | A1 | 6/2018 | Gibson et al. |
| 2018/0243985 | A1 | 8/2018 | Frenock |
| 2018/0304369 | A1 | 10/2018 | Myerberg et al. |
| 2018/0326658 | A1* | 11/2018 | Saito ................. B29C 64/20 |
| 2018/0335766 | A1 | 11/2018 | Jacobs, II |
| 2019/0016048 | A1* | 1/2019 | Parietti ............... A61K 9/4808 |
| 2019/0039310 | A1* | 2/2019 | Busbee ............... A43B 13/026 |
| 2019/0201980 | A1 | 7/2019 | Hyatt et al. |
| 2019/0204811 | A1 | 7/2019 | Adair et al. |
| 2019/0375156 | A1 | 12/2019 | Knox |
| 2020/0086424 | A1 | 3/2020 | Jones et al. |
| 2020/0276757 | A1 | 9/2020 | Susnjara et al. |
| 2020/0298481 | A1* | 9/2020 | Sankare ............... B29C 64/295 |
| 2020/0384756 | A1 | 12/2020 | Susnjara |

OTHER PUBLICATIONS

CN208946686 machine translation (Year: 2019).*
International Searching Authority, International Search Report and Written Opinion dated Nov. 4, 2021 in Serial No. PCT/US2021/035982.
International Bureau, International Preliminary Report on Patentability mail date of Dec. 15, 2022 with International App No. PCT/US2021/035982.
EPO, European Partial Search Report dated Jun. 20, 2024 in EP Serial No. 218170363.3.
https://www.youtube.com/watch?v=sx8WuwvYWeA&feature=emb_rel_end ( Cite No. DO 03) (accessed on May 7, 2024).
https://www.youtube.com/watch?v=WQDC3WXRi-A (Cite No. DO 01) (accessed on May 7, 2024).
https://www.youtube.com/watch?v=t3vS2LF1MqU (Cite No. DO 02) (accessed on May 7, 2024).
"Okuma—Products" webpage https://www.okuma.co.jp/english/product/laserex/index.html, 2 pages. Nov. 27, 2019, retrieved from Internet Archive Wayback Machine https://web.archive.org/web/20191127180637/https://www.okuma.co.jp/english/product/laserex/index.html on May 8, 2024.
"Hybrid Manufacturing Technologies" webpage http://www.hybridmanutech.com/products.html 2 pages. Mar. 16, 2019, retrieved from Internet Archive Wayback Machine https://web.archive.org/web/20190316172520/http://www.hybridmanutech.com/products.html on May 8, 2024.
"Mazak" webpage https://www.mazakusa.com/machines/integrex-i-400am 1 page. Mar. 8, 2016 retrieved from Internet Archive Wayback Machine https://web.archive.org/web/20160308223527/https://www.mazakusa.com/machines/integrex-i-400am on May 8, 2024.
"The Metal X An Industrial Revolution" webpage https://markforged.com/metal-x 4 pages. Jan. 28, 2017 retrieved from Internet Archive Wayback Machine https://web.archive.org/web/20170128121405/https://markforged.com/metal-x/ on May 8, 2024.
"Desktop Metal Office-friendly metal 3D printing" webpage https://www.desktopmetal.com/products/studio 3 pages. May 1, 2017 retrieved from Internet Archive Wayback Machine https://web.archive.org/web/20170501192945/https://www.desktopmetal.com/products/studio/ on May 8, 2024.
"Lithoz—Maufacture the Future" webpage https://www.lithoz.com/en 1 page. Jun. 5, 2012 retrieved from Internet Archive Wayback Machine https://web.archive.org/web/20120605010352/http://www.lithoz.com/en/ on May 8, 2024.
"Robocasting—3D Printing of Ceramics" webpage https://robocasting.net 1 page Feb. 27, 2001 retrieved from Internet Archive Wayback Machine https://web.archive.org/web/20170203010125/https://robocasting.net/ on May 8, 2024.
"Think Big Print Huge Gigabot webpage" https://re3d.org/gigabot/ 2 pages. Dec. 27, 2014 retrieved from Internet Archive Wayback Machine https://web.archive.org/web/20141227001554/https://re3d.org/gigabot/ on May 8, 2024.
"Pellet Extrusion" webpage https://titan3drobotics.com/pellet-extrusion 2 pages. Sep. 9, 2017 retrieved from Internet Archive Wayback Machine https://web.archive.org/web/20170909002104/https://titan3drobotics.com/pellet-extrusion on May 8, 2024.
"StoneFlower Multimaterial 3D Printer" webpage https://www.stoneflower3d.com/gallery/ 1 page. Aug. 13, 2019 retrieved from Internet Archive Wayback Machine https://web.archive.org/web/20190813002948/https://www.stoneflower3d.com/gallery/ on May 8, 2024.

* cited by examiner

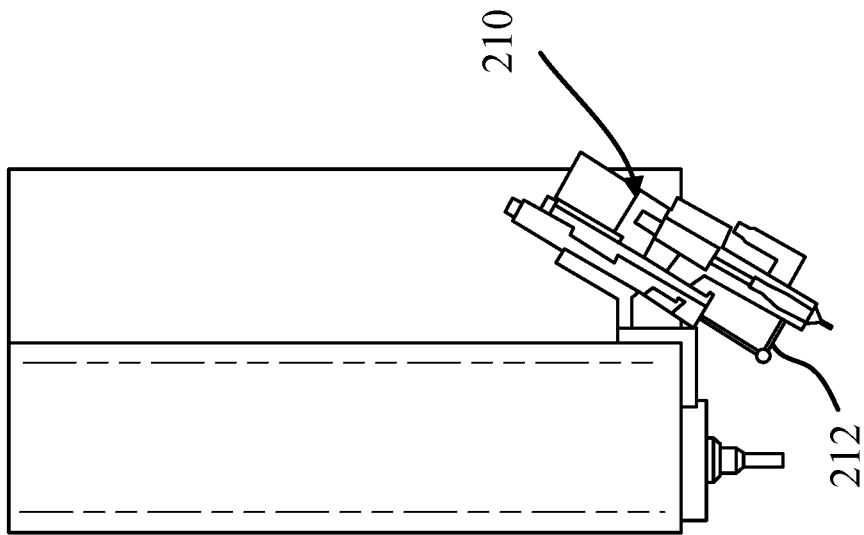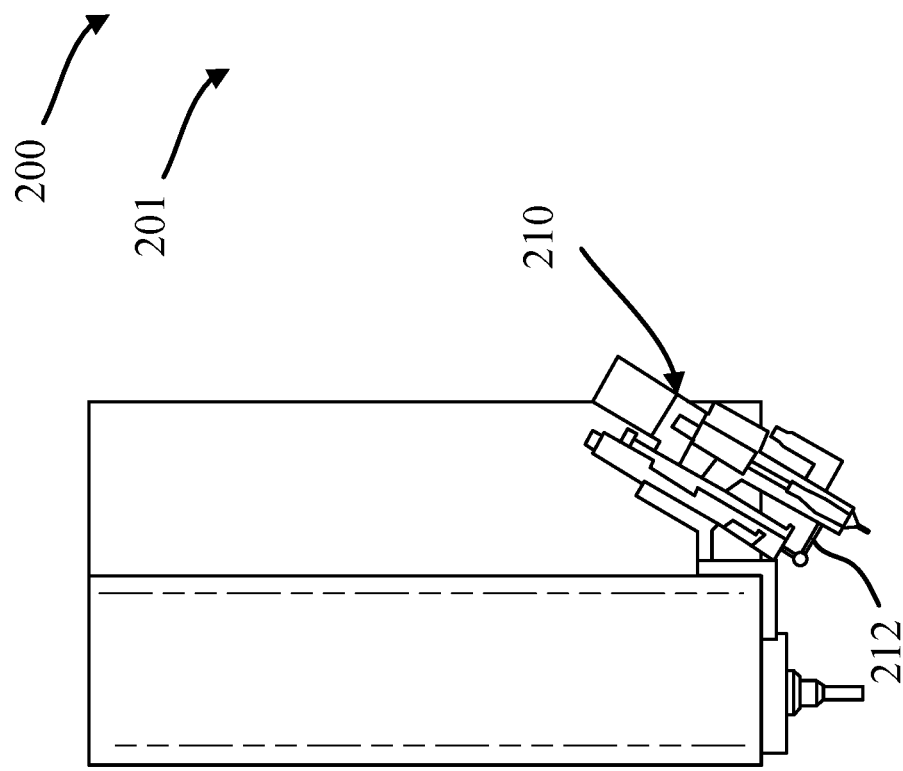

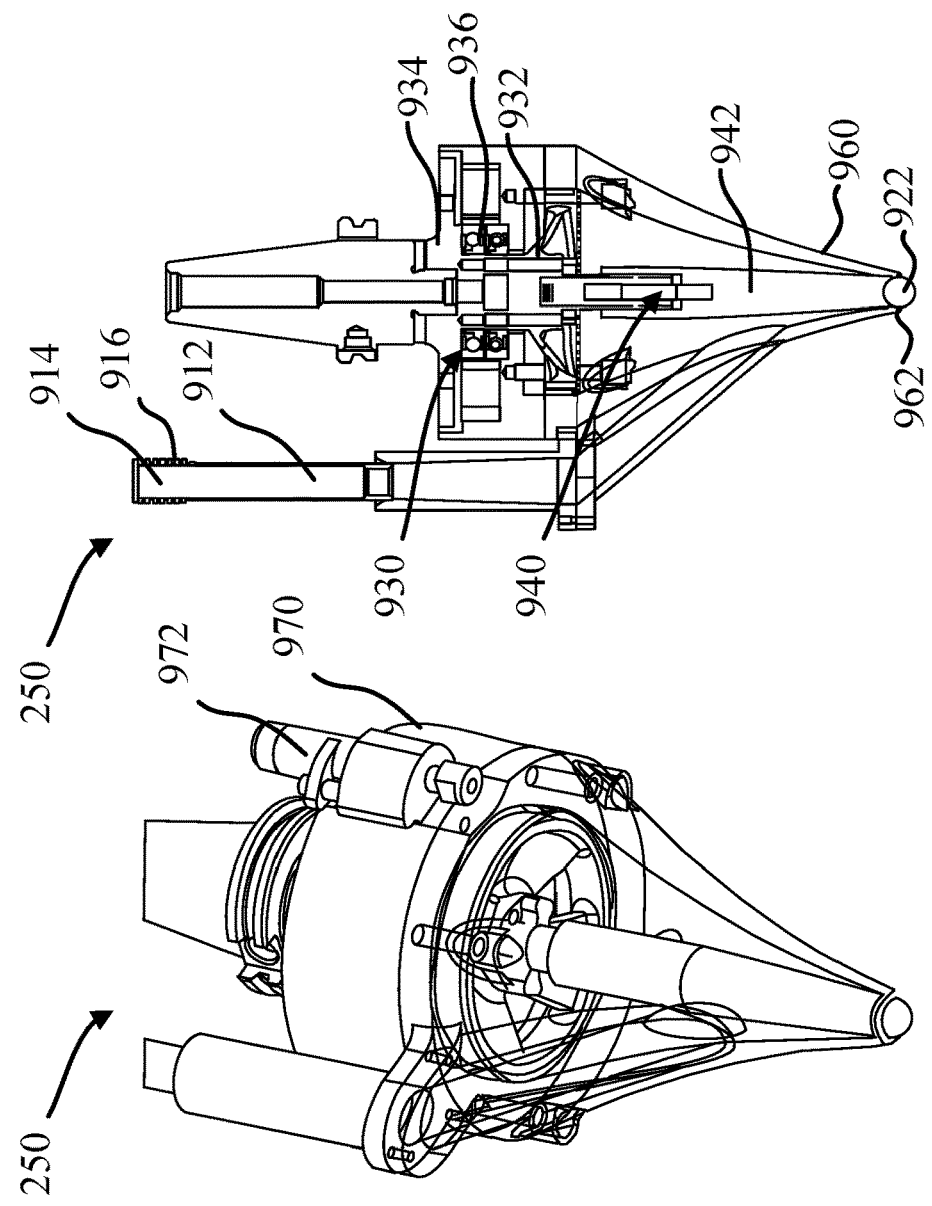
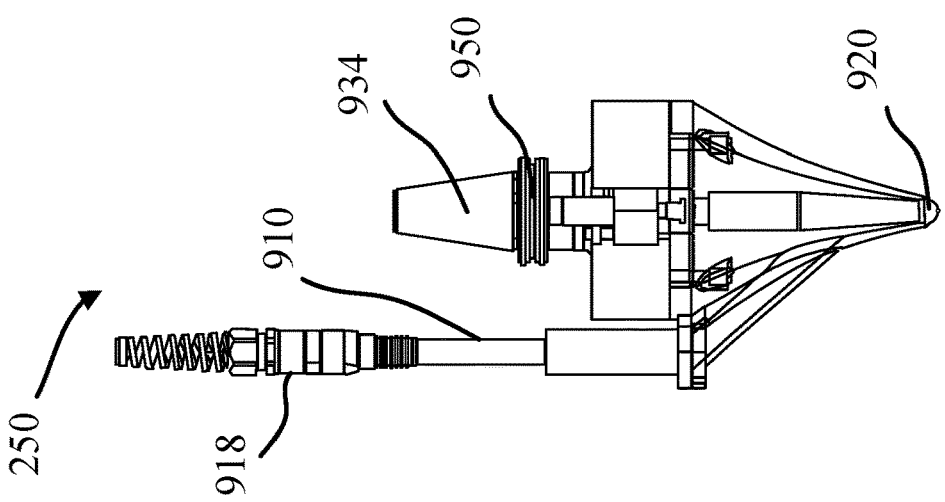
FIG. 9C  FIG. 9B  FIG. 9A

MANUFACTURING SYSTEMS AND METHODS FOR THREE-DIMENSIONAL PRINTING

CROSS REFERENCE TO RELATED APPLICATIONS

This application is a U.S. national stage entry under 35 U.S.C. § 371 of International Application No. PCT/US2021/35982 filed Jun. 4, 2021 entitled "MANUFACTURING SYSTEMS AND METHODS FOR THREE-DIMENSIONAL PRINTING", which claims priority to, and the benefit of, U.S. Provisional Application Ser. No. 63/035,335 entitled "HYBRID CNC MACHINING/3D PRINTING SYSTEMS AND METHODS THEREOF," filed on Jun. 5, 2020. The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to three-dimensional (3D) printing systems and methods, and in particular to systems and methods for efficiently 3D printing a component for powder injection through standard feedstock.

BACKGROUND

Computer numerical control (CNC) machines process a piece of material (e.g., metal, plastic, wood, ceramic, or composite) to meet specifications by following a coded programmed instruction and without a manual operator. CNC machines utilize drills, saws, etc., to machine the material to meet the desired specifications. In contrast, 3D printing devices are configured for additive manufacturing where material is layered by extruding many layers in succession. 3D printing devices are distinct devices from CNC machines, although they may be utilized in succession. This may result in a delay of producing a final product and potentially add additional operations. Thus, hybrid CNC machining/3D printing systems and methods may be desirable.

SUMMARY

An extrusion device for use in a 3D printing system, or a hybrid CNC machining/3D printing system is disclosed herein. The extrusion device may comprise: a heating system configured to heat a deposited layer prior to depositing a second layer. In various embodiments, the heating system may facilitate greater bonding of deposited layers relative to typical extrusion devices for 3D printing applications. In various embodiments, the heating system is independent and adaptable to being coupled to a typical computer numerical control (CNC) machining device via a mount, or the like. In various embodiments, the extrusion device includes an actuator configured to translate the extrusion device towards or away from a work piece.

In various embodiments, the extrusion devices disclosed herein may be adaptable for use in a three-dimensional (3D) printing device or a hybrid computer numerical control (CNC) machining/3D printing device. In various embodiments, the 3D printing device, whether hybrid or not, may include a spindle, or tool holder, configured to swap out the various extrusion devices or the 3D printing device may include multiple tool holders and hold multiple extrusion devices simultaneously.

The extrusion devices disclosed herein may be adaptable for various purposes (i.e., for an initial layer of additive mater to create a rough shape, for a finer layer to define finer features of a respective component, and/or a support layer to provide additional structural support to unsupported areas). The extrusion devices may be utilized in succession (via swapping extrusion devices for swappable systems or immediately for systems with multiple extrusion devices) to create a robust 3D printed component, in accordance with various embodiments.

A hybrid computer numerical control (CNC) machining/three-dimensional (3D) printing system is disclosed herein. The system may comprise: a frame having a spindle, the spindle configured to receive a subtractive component; a first extrusion unit coupled to the frame, the first extrusion unit comprising a first heating system, wherein the heating system heats a deposited layer prior to depositing a second layer; and a controller in electrical communication with the frame, the spindle, and the first extrusion unit.

In various embodiments, the controller is operable to: command the first extrusion unit to layer a material in a predetermined shape; and command the spindle to machine the material via the subtractive component based on a desired specification. The hybrid CNC machining/3D printing system may further comprise a second extrusion unit coupled to the frame, the second extrusion unit comprising a second heating system in accordance with the first heating system. The first extrusion unit may comprise a first nozzle; the second extrusion unit may comprise a second nozzle; and the first nozzle has a first diameter that may be greater than a second diameter of the second nozzle. In various embodiments, the controller is in electrical communication with the second extrusion unit, and wherein the controller is operable to: command the first extrusion unit to layer a bulk material in a predetermined shape; command the spindle to machine via the subtractive component the bulk material based on a desired specification; and command the second extrusion unit to deposit a second material to fill voids in the bulk material or deposit a support material to add support to the predetermined shape. The system may further comprise a third extrusion unit coupled to the spindle, the third extrusion unit comprising a third heating system in accordance with the first heating system. In various embodiments, the controller is in electrical communication with the second extrusion unit, and wherein the controller is operable to: command the first extrusion unit to layer a bulk material in a predetermined shape; command the subtractive component to machine the bulk material based on a desired specification; command the second extrusion unit to deposit a second material to fill voids in the bulk material; and command the third extrusion unit to deposit a support material to add support to the predetermined shape.

A method of manufacturing a three-dimensional (3D) component is disclosed herein. The method may comprise: layering, through a first extrusion unit of a manufacturing system, a first material in a predetermined shape; machining, via the manufacturing system, the first material to a desired specification; and depositing, through a second extrusion unit of the manufacturing system, a second material to fill voids in the first material. The method may further comprise conforming, via a conforming/condensing tool of the manufacturing system, the first material. The method may further comprise depositing, through a third extrusion unit of the manufacturing system, a support material to add support to the predetermined shape. In various embodiments, the first extrusion unit comprises a first nozzle; the second extrusion unit comprises a second nozzle; and the first nozzle has a first diameter greater than a second diameter of the second nozzle. The method may further comprise swapping the first extrusion unit with the second extrusion unit prior to depositing the second material. The first extrusion unit and the second extrusion unit may each comprise a heating system including a hot-air blower configured to heat a material during depositing the material.

A method of manufacturing a three-dimensional (3D) component is disclosed herein. The method may comprise: layering, through a first extrusion unit of a manufacturing system, a first material in a predetermined shape, the first extrusion unit including a first nozzle; swapping, via the manufacturing system, the first extrusion unit for a second extrusion unit, the second extrusion unit including a second nozzle, the first nozzle having a first diameter that is greater than a second diameter of the second nozzle; and depositing, through the second extrusion unit of the manufacturing system, a second material to fill voids in the first material. The method may further comprise condensing, via a condensing device of the manufacturing system. Condensing the first material may further comprise heating, via the condensing device, the first material simultaneously. In various embodiments, layering the first material further comprises layering a filament within the first material via a spool feeder of the manufacturing system.

A condensing device for use in a 3D printing system is disclosed herein. The condensing device may comprise: a first spindle taper adaptable to be operably coupled to a spindle of a computer numerical control (CNC) machine; a nozzle defining a tip; a housing coupled to the nozzle; a fluid driving system disposed between the first spindle and the nozzle, the fluid driving system configured to drive a fluid towards a fluid outlet disposed proximate to the tip of the nozzle; and a material forming apparatus disposed proximate the tip of the nozzle.

In various embodiments, the condensing device may comprise a plumbing system configured to couple to a heating system of the CNC machine. The plumbing system may be configured to receive hot-air during operation of the condensing device via the CNC machine. The condensing system may further comprise a damping system coupled to the material forming apparatus. The damping system may comprise a strut. The fluid driving system may comprise a turbine configured to rotate relative to the housing.

An extrusion device for use in a 3D printing system is disclosed herein. The extrusion device may comprise: a drive motor; an auger coupled to the drive motor; a housing assembly, the auger disposed within the housing assembly, the auger configured to translate a material to be deposited through the housing assembly; a hopper in fluid communication with the housing assembly; a heating system coupled to the housing assembly, wherein the heating system heats a deposited layer prior to depositing a second layer; and at least one of a mount or an actuator, wherein at least one of the mount or the actuator can be removably coupled to a computer numerical control (CNC) machining device.

In various embodiments, the heating system further comprises a hot-air blower in fluid communication with a hot-air duct. The extrusion device may further comprise a nozzle in fluid communication with the housing assembly. The extrusion device may further comprise an outlet of the hot-air duct, wherein the outlet is disposed radially outward of the nozzle. The heating system may further comprise a first hot-air blower disposed radially outward of the housing assembly. The heating system may further comprise a second hot-air blower disposed radially outward of the housing assembly. The extrusion device may further comprise a spool feeder system configured to feed a filament into the housing assembly and intersect with the material to be deposited. The spool feeder system may comprise a spool, a second drive motor, and a shaft. The second drive motor may be configured to drive the shaft, and wherein the spool is configured to rotate in response to the shaft being driven.

The foregoing features and elements may be combined in various combinations without exclusivity, unless expressly indicated otherwise. These features and elements as well as the operation thereof will become more apparent in light of the following description and the accompanying drawings. It should be understood; however, the following description and drawings are intended to be exemplary in nature and non-limiting. The contents of this section are intended as a simplified introduction to the disclosure and are not intended to limit the scope of any claim.

BRIEF DESCRIPTION OF THE DRAWINGS

With reference to the following description and accompanying drawings:

FIG. 2B illustrates a side view of a portion of a hybrid computer numerical control (CNC) machining/three-dimensional (3D) printing system, in accordance with various embodiments;

FIG. 2C illustrates a side view of a portion of a hybrid computer numerical control (CNC) machining/three-dimensional (3D) printing system, in accordance with various embodiments;

FIG. 9A illustrates a side view of a condensing/conforming tool, in accordance with various embodiments;

FIG. 9B illustrates a perspective view of a condensing/conforming tool, in accordance with various embodiments;

FIG. 9C illustrates a cross-sectional view of a condensing/conforming tool, in accordance with various embodiments;

DETAILED DESCRIPTION

Figure 1:
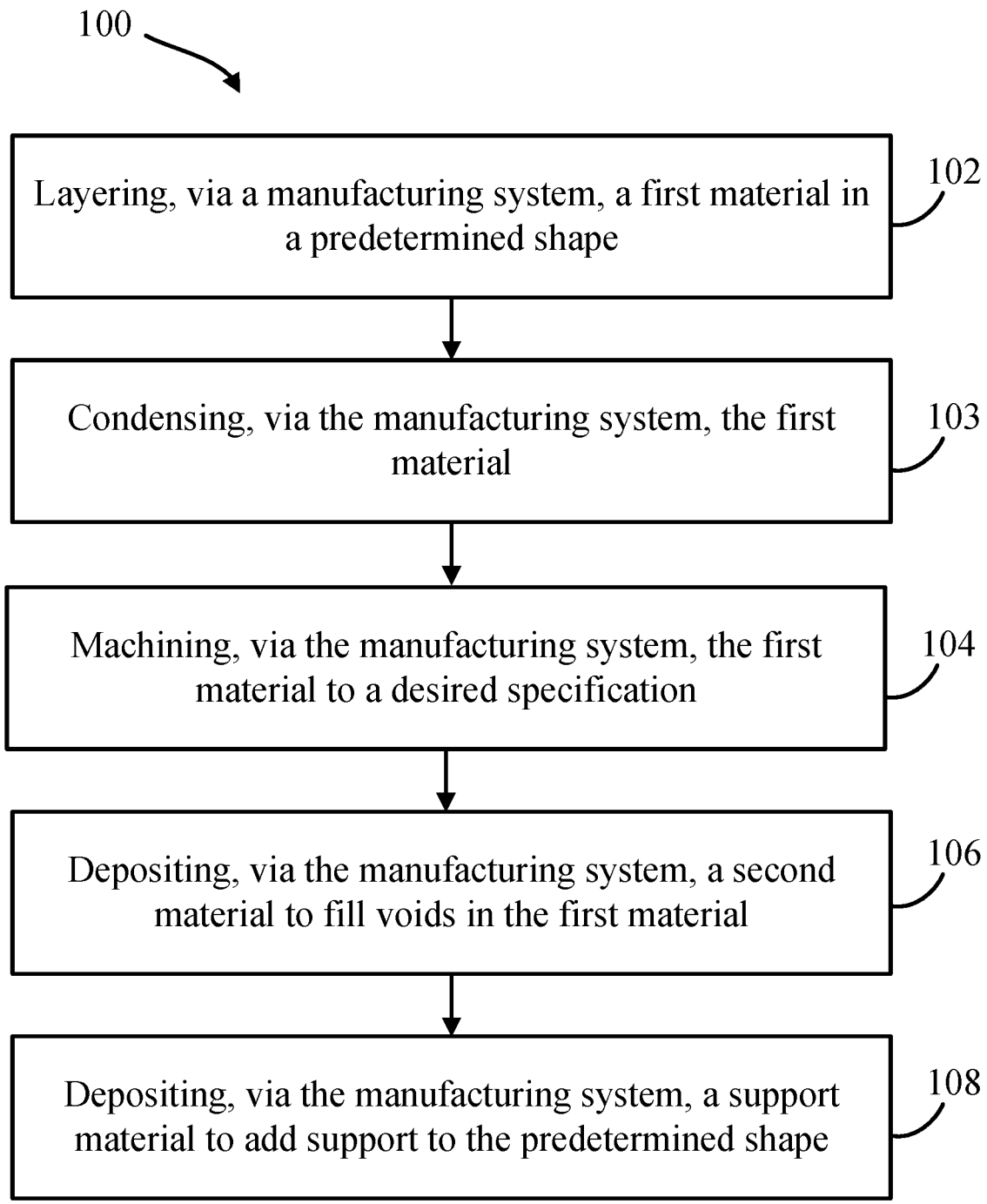
FIG. 1 illustrates a method for 3D printing a component, in accordance with various embodiments.

The following description is of various exemplary embodiments only and is not intended to limit the scope, applicability or configuration of the present disclosure in any way. Rather, the following description is intended to provide a convenient illustration for implementing various embodiments, including the best mode. As will become apparent, various changes may be made in the function and arrangement of the elements described in these embodiments without departing from principles of the present disclosure.

For the sake of brevity, conventional techniques and components may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary systems and/or components thereof.

In various embodiments, various components for producing more detailed three-dimensional components in a more efficient manner relative to typical systems and methods is disclosed herein. For example, an improved extrusion device is disclosed herein, which is adaptable to be mounted to a typical CNC machine and/or retrofitted to a typical CNC machine. Additionally, the improved extrusion device may include an independent heating system, such as a hot air blower, or the like configured to heat a layer being deposited, or a layer below a layer being deposited during material deposition to create a stronger bond during an additive process, in accordance with various embodiments. In various embodiments, the improved extrusion device may further comprise a spool feeder in communication with a nozzle of the improved extrusion device. In this regard, the spool feeder may be configured to feed a filament into the nozzle to be deposited with a material being deposited through the extrusion device to create a composite component that is stronger and/or more robust relative to the material on its own.

Also disclosed herein is a condensing/conforming device configured to condense and/or conform material after a deposition step in a 3D printing process, in accordance with various embodiments. In various embodiments the condensing/conforming device is configured to be used subsequently from the extrusion device disclosed herein. In various embodiments, the condensing/conforming tool comprises a heating system configured to heat the material that was previously deposited during the deposition step in order to facilitate greater bonding between layers and a smoother, more uniform component relative to typical systems and processes.

In various embodiments, a method for manufacturing a 3D component via a manufacturing system is disclosed herein. The manufacturing system may include a hybrid computer numerical control (CNC) machining/3D printing device including a machining center (e.g., a spindle taper), a first extrusion unit, a second extrusion unit, and/or a third extrusion unit. "Hybrid," as disclosed herein, refers to a system configured for granular material deposition, subtraction of the material, and/or condensing the material, in accordance with various embodiments. In various embodiments, the hybrid CNC machining/3D printing device may be configured to manufacture a high quality component, in an efficient manner, without manual assistance during the process. In this regard, the manufacturing system may be configured to lay down a rough shape of the final component with the first extrusion unit, mill the rough shape to predetermined specifications with the mill, fill in any voids with the second extrusion unit, and/or add support material to unsupported areas with the third extrusion unit. The first extrusion unit, the second extrusion unit, and the third extrusion unit may be substantially similar. Each extrusion unit may comprise a removeable nozzle. The removeable nozzle may allow for a nozzle diameter to be varied for a respective extrusion unit. As such, a first extrusion unit may be configured to deposit bulk material with a larger diameter nozzle and the second extrusion unit may be configured to deposit finer particles with a smaller diameter nozzle, in accordance with various embodiments.

In various embodiments, the first extrusion unit, the second extrusion unit, and the third extrusion unit may be retrofitted to a typical CNC machine, resulting in the hybrid CNC machining/3D printing device. In various embodiments, the first extrusion unit, the second extrusion unit, and the third extrusion unit may be integral to a hybrid CNC machining/3D printing device. In various embodiments, the first extrusion unit, the second extrusion unit, and/or the third extrusion unit may comprise a linear actuator. The linear actuator may be configured to translate a respective extrusion unit prior to, or during, a layering and/or depositing step of a method of manufacturing as described herein. Although described herein as comprising a mill, any subtractive machining component of a CNC machining device is within the scope of this disclosure. For example, a lathe configured for turning, facing, parting, grooving, drilling, milling, and/or any combination of the subtractive machining components are within the scope of this disclosure.

Referring now to FIG. 1, a method for manufacturing a 3D component is illustrated, in accordance with various embodiments. The method 100 comprises layering, via a manufacturing system, a first material in a predetermined shape (step 102). The manufacturing system may comprise a hybrid CNC machining/3D printing device, or a 3D printing device and a CNC machine, in accordance with various embodiments. The manufacturing system may comprise a mill, and at least one extrusion unit. The mill may be configured for subtractive manufacturing and at least one extrusion unit may be configured for additive manufacturing. The predetermined shape may be a rough shape of the 3D component. The first material may be layered via a first extrusion unit of the 3D printing device. The first material may comprise a ceramic injection molding (CIM) powder, a metal injection molding (MIM) powder, a polymer based material, or any other 3D printing material known in the art. The first extrusion unit may be configured to deposit a bulk of the first material in the rough shape of the 3D component.

In various embodiments, the method 100 further comprises condensing, or conforming, via the manufacturing system, the first material (step 103). Although illustrated as condensing/conforming prior to machining in step 104, the present disclosure is not limited in this regard. For example, the condensing or conforming step 103 may be utilized after any other step in method 100, in accordance with various embodiments. The manufacturing system may further comprise a condensing/conforming tool, which will be described further herein. The condensing/conforming tool may be adaptable to a CNC tool changer as described further herein. In this regard, various condensing/conforming tools may be utilized based on specific applications, in accordance with various embodiments.

In various embodiments, the method 100 further comprises machining, via the manufacturing system, the first material to a desired specification (step 104). In various embodiments, the machining may comprise turning or drilling, or more preferably milling. A machining component, such as a mill, may be a component of the hybrid CNC machining/3D printing device. The desired specification may correspond to desired geometric constraints of the 3D component to be printed. In this regard, the machining step may result in a machined component that is within the desired specification of the 3D component to be manufactured.

In various embodiments, the method 100 further comprises depositing, via the manufacturing system, a second material to fill voids in the first material and/or create finer features of the 3D component (step 106). In various embodiments, step 106 may be performed before or after steps 103, 104. The second material may be deposited via a second extrusion unit of the hybrid CNC machining/3D printing device. The second material may comprise a ceramic injection molding (CIM) powder, a metal injection molding (MIM) powder, a polymer based material, or any other 3D printing material known in the art. The second material may be the same as the first material. The second extrusion unit may be configured to deposit a smaller portion of the second material relative to the first extrusion unit. For example, the second extrusion unit may comprise a nozzle having a smaller cross-sectional diameter relative to a nozzle of the first extrusion unit. In this regard, in accordance with various embodiments, the second extrusion unit may be configured to deposit a smaller diameter of material relative to the first extrusion unit for finer features and/or to fill in voids left from the first material.

In various embodiments, the method 100 further comprises depositing, via the manufacturing system, a support material to add support to the predetermined shape (step 108). The second material may be deposited via a third extrusion unit of the hybrid CNC machining/3D printing device. In various embodiments, a 3D component may comprise a flange, or any other feature that may need additional support to prevent collapsing of the feature. In this regard, a support material may be deposited to provide the additional support to the 3D component. In various embodiments, the support material may be a different material than the first material and/or the second material. For example, the support material may comprise a polyethylene glycol (PEG) material, a polyvinyl alcohol (PVA) material, or the like. In various embodiments, the support material may comprise a material configured to be thermally removed, such as a wax material or any other material capable of being removed when exposed to heat. Also, in various embodiments, removal of the support material via a solvent-based process is within the scope of this disclosure.

Although described herein with three extrusion units configured for additive manufacturing, one milling component configured for subtractive manufacturing, and one condensing/conforming tool, the manufacturing system herein may include any combination of subtractive manufacturing components, condensing/conforming tools, and additive manufacturing components on a single hybrid CNC machining/3D printing device. For example, in accordance with various embodiments, a hybrid CNC machining/3D printing device includes at least one subtractive manufacturing component (e.g., a mill, a lathe, a drill, etc.), at least one condensing/conforming tool, and/or at least one additive manufacturing component (e.g., a first extrusion unit, a second extrusion unit, a third extrusion unit, etc.).

In various embodiments, the method 100 disclosed herein is faster and more efficient relative to typical manufacturing processes. For example, by utilizing a hybrid, multi-functional, system, a 3D printed component does not have to change between a 3D printing machine and a CNC machine to switch from performing an additive step and a subtractive step, in accordance with various embodiments. In this regard, significant time may be saved during the method 100 from FIG. 1, in accordance with various embodiments. Furthermore, tighter tolerances and/or stronger bonding between layers may be obtained via method 100 through using the conforming/condensing tool throughout the process 100 (e.g., step 103) and/or heating throughout the depositing steps (e.g., steps 102, 106, 108) in accordance with various embodiments.

Figure 2A:
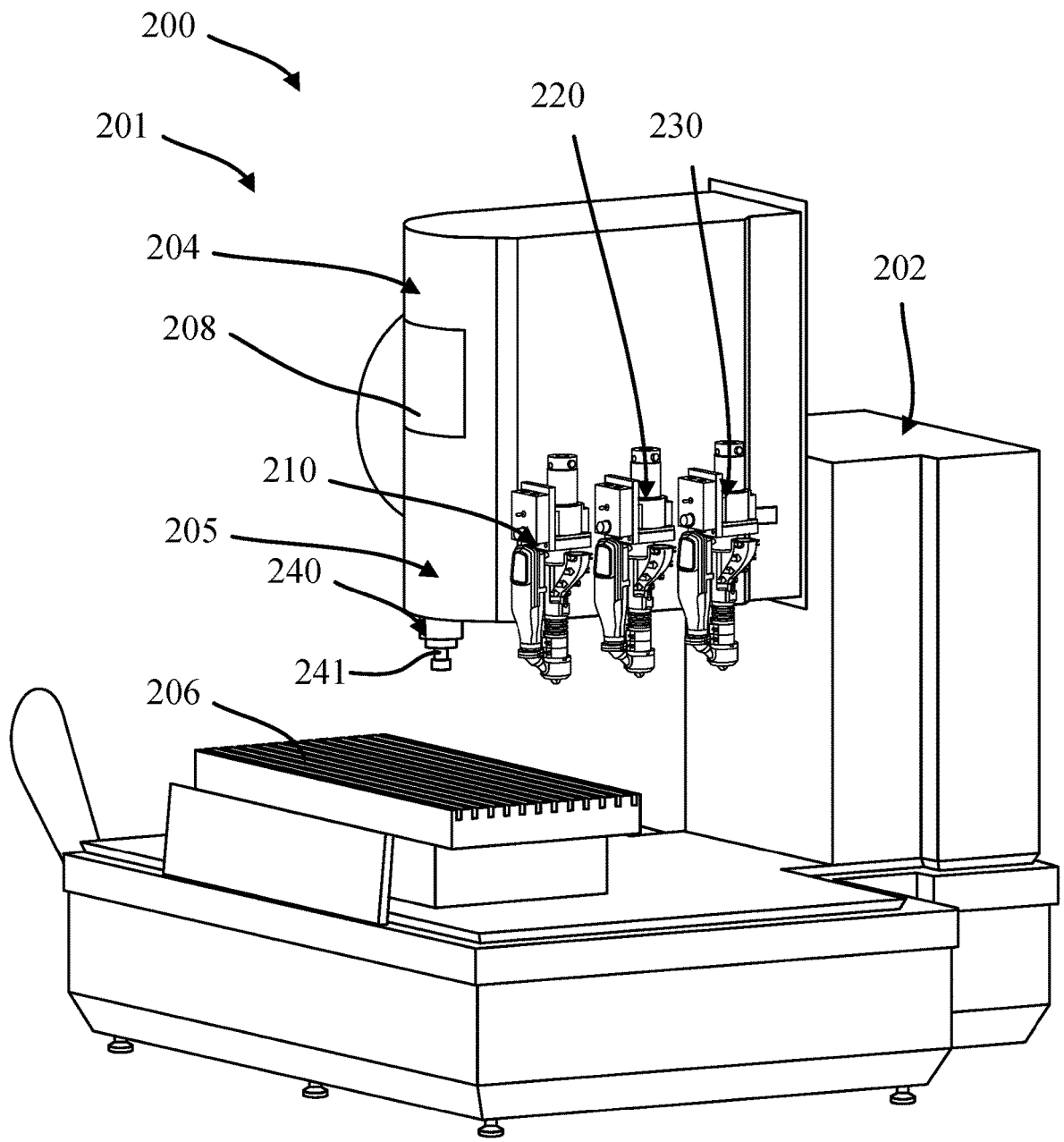
FIG. 2A illustrates a perspective view of a hybrid computer numerical control (CNC) machining/three-dimensional (3D) printing system, in accordance with various embodiments.
Figure 2D:
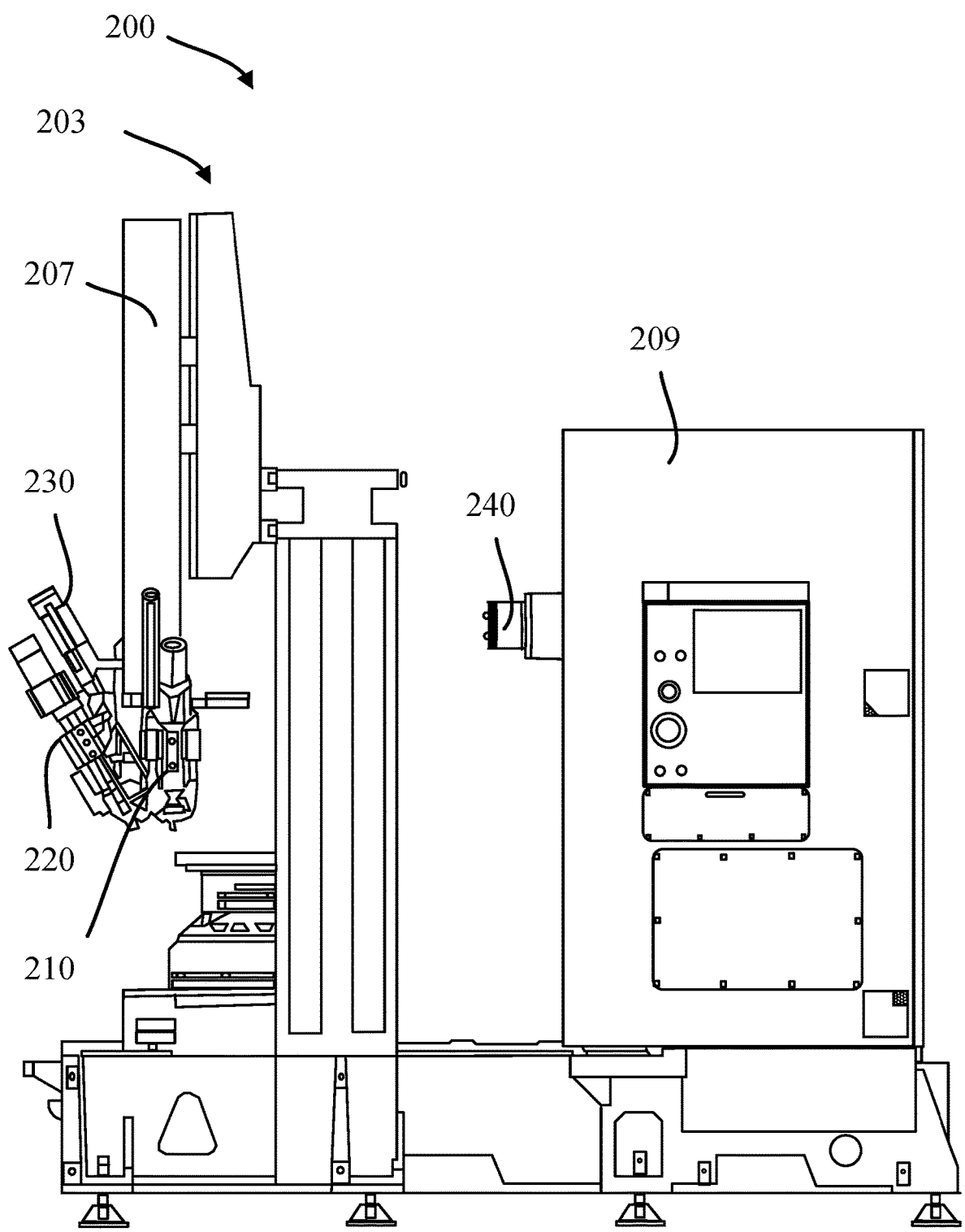
FIG. 2D illustrates a side view of a portion of a hybrid computer numerical control (CNC) machining/three-dimensional (3D) printing system, in accordance with various embodiments.

Referring now to FIG. 2A, a perspective view of a manufacturing system 200 configured to manufacture a 3D component in accordance with method 100 from FIG. 1, is illustrated in accordance with various embodiments. The manufacturing system 200 may comprise a hybrid CNC machining/3D printing device 201. In various embodiments, the manufacturing system 200 may comprise an additive component configured for additive manufacturing (e.g., a first extrusion unit 210) and a CNC tool (e.g., a subtractive component 240 configured for a subtractive manufacturing process, such as a mill 241, a lathe, a drill, etc.). Although illustrated in FIG. 2A as a subtractive component 240, the present disclosure is not limited in this regard. For example, in various embodiments, the subtractive component 240 may be swapped out via the hybrid CNC machining/3D printing device 201 with a condensing/conforming tool as described further herein. In this regard, in response to swapping out to a condensing/conforming tool, the hybrid CNC machining/3D printing device 201 may be configured to conform a 3D printed component at various stages in the manufacturing process as described further herein (i.e., during manufacturing step 103 from method 100). In various embodiments, the hybrid CNC machining/3D printing device 201 may comprise more than one additive component (e.g., first extrusion unit 210) and/or more than one CNC tool (e.g., multiple subtractive components 240, a single subtractive component 240 and a condensing/conforming tool, etc.) as described previously herein. In this regard, the hybrid CNC machining/3D printing device 201 is configured to more efficiently produce a high quality 3D component without human interference between an additive step, a condensing/conforming step, and/or a subtractive step of a manufacturing process (e.g., method 100 from FIG. 1). In various embodiments, the hybrid CNC machining/3D printing device 201 is configured to subtractive manufacturing, additive manufacturing, and/or condensing/conforming a respective component along three to five axis (e.g., along an X-Y-Z axis, along X-Y-Z axis and a rotational axis, along X-Y-Z axis and two rotational axis, or as many axis as current CNC machines enable). In various embodiments, the manufacturing system 200 comprises a vertical machining system (e.g., hybrid CNC machining/3D printing device 201 from FIG. 2A) or a horizontal machining system (e.g., hybrid CNC machining/3D printing device 203 from FIG. 2D).

The hybrid CNC machining/3D printing device 201 may be configured to print a rough shape of a 3D component with a first extrusion unit 210 (e.g., step 102 of method 100 from FIG. 1). In this regard, the first extrusion unit 210 may be configured to receive the first material via a hopper, or the like as described further herein. In various embodiments, the hybrid CNC machining/3D printing device 201 may be configured to machine with the subtractive component 240 the rough shape of the 3D component to a desired specification (e.g., step 104 from FIG. 1).

In various embodiments, the hybrid CNC machining/3D printing device 201 may be configured to deposit a second material to fill voids in the first material (e.g., step 106 from FIG. 1). In this regard, in accordance with various embodiments, the hybrid CNC machining/3D printing device 201 may comprise a second extrusion unit 220 configured to receive the second material via a hopper, or the first extrusion unit 210 may be configured to change a diameter of a respective nozzle and receive the second material. In various embodiments, the first material is the same as the second material. In various embodiments, the second material may be a finer diameter/particulate than the first material. In this regard, the second material may be configured for more detailed additive features of the 3D component. In various embodiments, the hybrid CNC machining/3D printing device 201 may be configured to deposit a support material to add support to the predetermined shape (e.g., step 108 of method 100 from FIG. 1). As such, the support material may be a different material than the first material and/or the second material.

In various embodiments, the hybrid CNC machining/3D printing device 201 further comprises a first frame 202, a second frame 204, and a work table 206. The second frame 204 and the work table 206 may each be coupled to the first frame 202. The first frame 202 is a fixed frame. In various embodiments, the second frame 204 includes a spindle 205. The spindle 205 comprises a motor, a taper for holding tools (referred herein as a "tool holder" and/or a "spindle"), and a shaft that holds together the separate components. In various embodiments, the second frame 204 may be configured to move relative to the first frame 202. In this regard, second frame 204 may be a moving frame in accordance with various embodiments. In various embodiments, the work table 206 may be configured to move relative to the frames 202, 204. In this regard, frames 202, 204 may be fixed in various embodiments. In various embodiments, both the work table 206 and the second frame 204 may be configured to move relative to the first frame 202. During an additive step (e.g., steps 102, 106, and/or 108 from FIG. 1), material may be deposited on the work table 206, during a condensing/conforming step (e.g., step 103), the material may be condensed/conformed on the work table 206, and/or during a subtractive step (e.g., step 104), the material may be machined on the work table 206.

Although illustrated as having extrusion units 210, 220, 230 and the subtractive component 240 being coupled to the same frame (e.g., frame 204), the present disclosure is not limited in this regard. For example, with brief reference to FIG. 2D the extrusion units 210, 220, 230 may be coupled to a first frame 207, and the subtractive component 240 may be coupled to a spindle disposed on a second frame 209, in accordance with various embodiments. When coupled to separate frames (e.g., frames 207, 209 of FIG. 2D), the hybrid CNC machining/3D printing device 203 of the manufacturing system 200 may be configured to perform an additive step (e.g., step 102, 106, and/or 108) near simultaneously with a subtractive step (e.g., step 104), resulting in a more efficient manufacturing process, in accordance with various embodiments.

In various embodiments, the subtractive component 240, the first extrusion unit 210, the second extrusion unit 220, the third extrusion unit 230, the spindle 205, and/or the work table 206 are in electric communication with a controller 208. The controller may be disposed anywhere on the hybrid CNC machining/3D printing device 201. In various embodiments, the controller may be disposed on the spindle 205, but the disclosure is not limited in this regard.

Referring now to FIG. 2B, a side view of a hybrid CNC machining/3D printing device 201 of a manufacturing system 200 with an extrusion unit (e.g., first extrusion unit 210) in a first position is illustrated, in accordance with various embodiments. Although illustrated as comprising the first extrusion unit 210, any extrusion unit may be configured in accordance with FIG. 2B. For example, second extrusion unit 220 and/or third extrusion unit 230 may be in accordance with the first extrusion unit 210 of FIG. 2B. In various embodiments, the first extrusion unit 210 comprises an actuator 212 (e.g., a linear actuator). In various embodiments, the actuator 212 is configured to translate the extrusion unit (e.g., first extrusion unit 210) relative to an extrusion unit housing. For example, with reference now to FIG. 2C, the first extrusion unit 210 may translate from a first position (e.g., FIG. 2B) to a second position (e.g., FIG. 2C) during a layering and/or depositing step from method 100 from FIG. 1 (e.g., steps 102, 106, and/or 108).

Figure 2F:
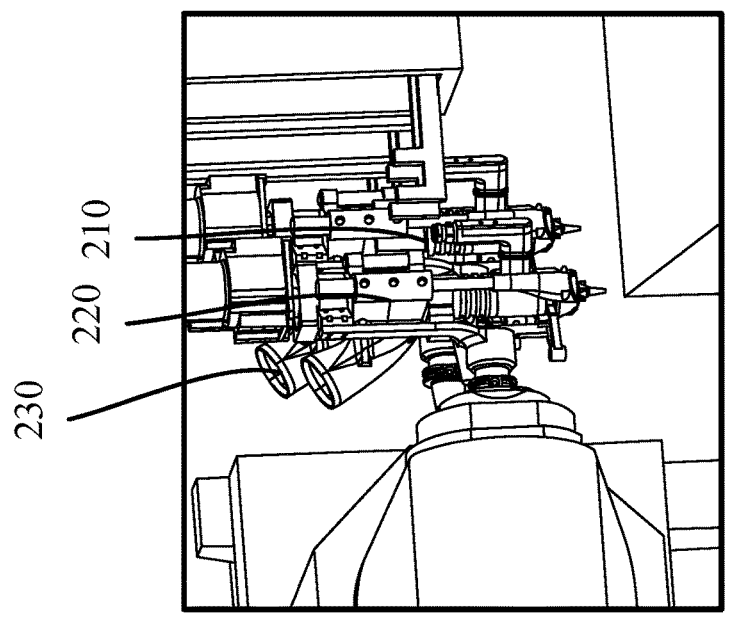
FIG. 2F illustrates a perspective view of a portion of a three-dimensional (3D) printing system, in accordance with various embodiments.
Figure 2E:
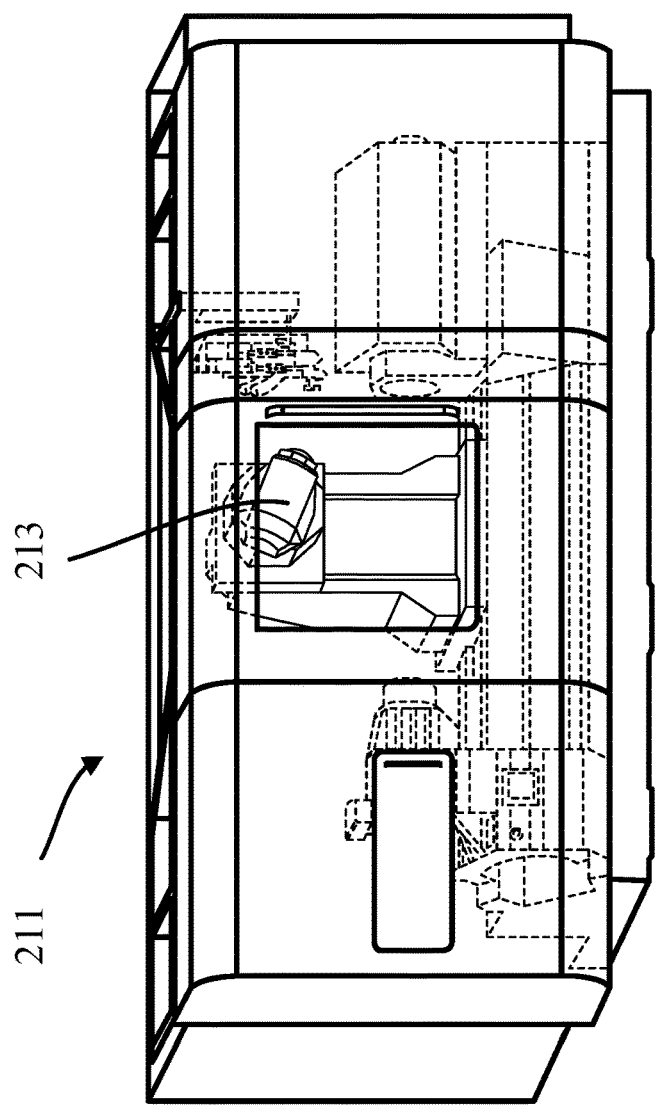
FIG. 2E illustrates a side view of a portion of a three-dimensional (3D) printing system, in accordance with various embodiments.

In various embodiments, the extrusion units disclosed herein (e.g., extrusion units 210, 220, 230) are not limited to hybrid CNC machining/3D printing devices 201, 203. For example, with reference now to FIGS. 2E-2F, extrusion units 210, 220, 230 may be configured and adaptable for a 3D printing device 211. In this regard, extrusion units 210, 220, 230 may be used in a 3D printing system, a hybrid machining/3D printing system, or the like. Although illustrated as having multiple extrusion units (e.g., extrusion units 210, 220, 230) all coupled to frame 204 of FIG. 2A simultaneously, the present disclosure is not limited in this regard. For example, as shown in FIGS. 2E-F, an additive tool holder 213 of a 3D printing device 211 may be adaptable to couple to each extrusion unit disclosed herein (e.g., extrusion units 210, 220, 230) independently and swap out extrusion units when moving to a next step in method 100 from FIG. 1. Although illustrated as being a part of 3D printing device 211, the single tool holder 213 for extrusion units 210, 220, 230 may be utilized in hybrid CNC machining/3D printing devices 201, 203, in accordance with various embodiments.

Figure 3:
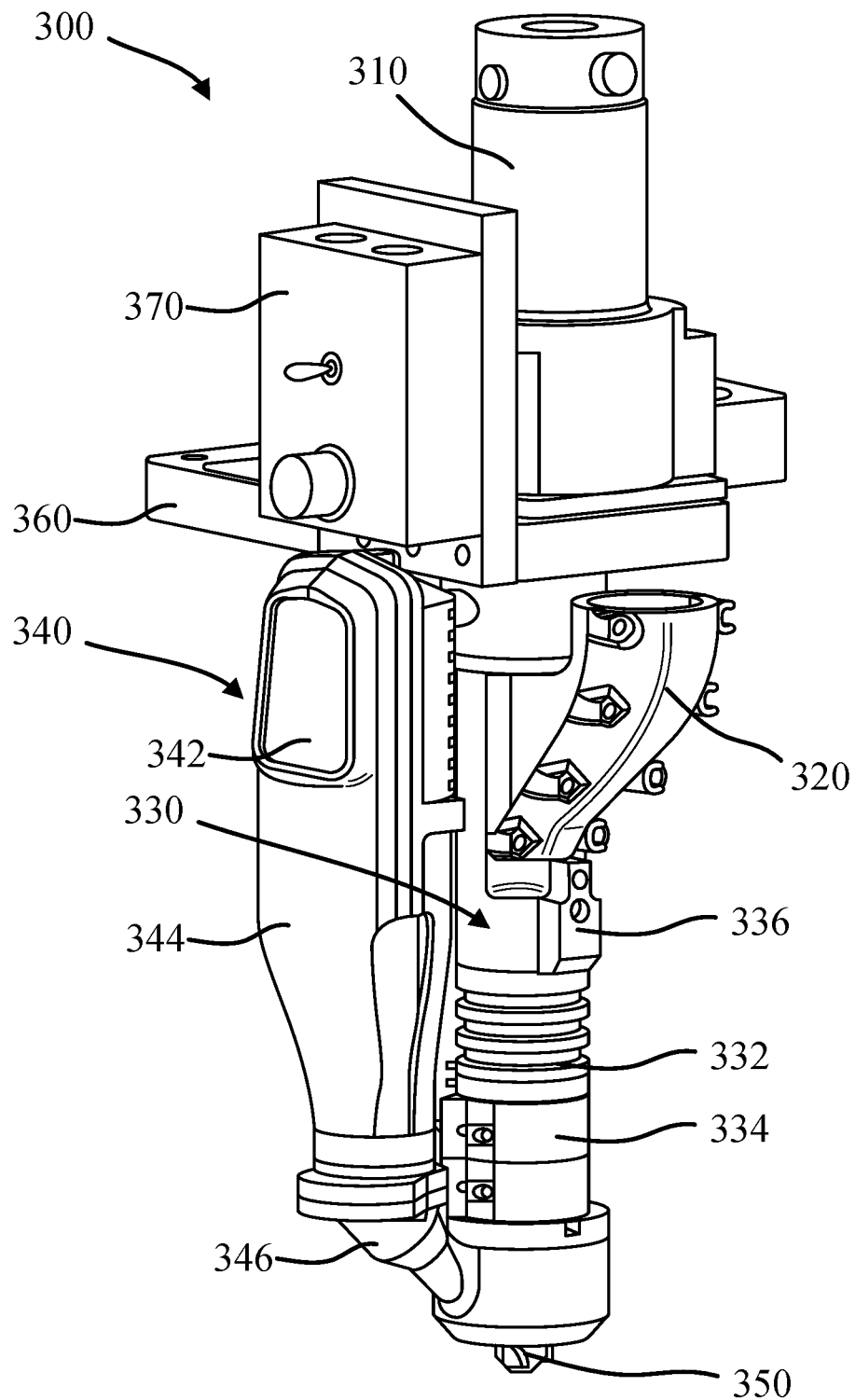
FIG. 3 illustrates a perspective view of an extrusion device, in accordance with various embodiments.

Referring now to FIG. 3, a perspective view of an extrusion device 300, in accordance with various embodiments, is illustrated. In various embodiments, the first extrusion unit 210, the second extrusion unit 220, and/or the third extrusion unit 230 may be in accordance with extrusion device 300. In various embodiments, the extrusion device 300 includes a drive motor 310, a hopper 320, a housing assembly 330, a heating system 340, and a nozzle 350. In various embodiments, the drive motor 310 is configured to drive an auger, a screw, a plunger, or the like disposed in the housing assembly 330. The hopper 320 may be in fluid communication with the housing assembly 330. In this regard a material is fed through the hopper 320 into the housing assembly 330. The housing assembly 330 may be configured to mount to a continuous feed system (i.e., an autoloader common in plastic injection molding) configured to couple to the hopper 320. The continuous feed system may be configured to feed a material into the housing assembly 330 via the hopper 320, and the drive motor 310 may drive the material out through the nozzle 350 during a layering or depositing step of method 100 from FIG. 1 (e.g., step 102, 106, and/or 108). The housing assembly 330 may be configured to mount to the CNC machine and convert the CNC machine to a hybrid CNC machining/3D printing device (e.g., hybrid CNC machining/3D printing device 201 from FIGS. 2A-2C or hybrid CNC machining/3D printing device 203 from FIG. 2D, or 3D printing device 211 from FIG. 2E). For example, the extrusion device 300 may further comprise a mount 360. The mount 360 may be configured to mount to a typical CNC machine by any method known in the art (e.g., fasteners, welding, brazing, casting, machining, etc.).

In various embodiments, the heating system 340 comprises a hot-air blower 342, a heater housing 344, and a hot-air duct 346. "Hot-air" as described herein refers to air that is heated between approximately 38° C. (100° F.) and 200° C. (392° F.). In various embodiments the hot-air blower 342 is housed in the heater housing 344 and configured to output hot-air through the hot-air duct 346. The hot-air that is disposed through the hot-air duct may be configured to heat a layer of material below a layer being deposited during the layering step of method 100 from FIG. 1 (e.g., step 102), and/or heat a layer of material below a layer during a depositing step of method 100 from FIG. 1 (e.g., steps 102, 106, 108). In this regard, an output of the hot-air duct 346 may be disposed circumferentially around the nozzle 350. Thus, the hot-air may directly contact a layer below a layer being deposited (e.g., during steps 102, 106, 108 of method 100 from FIG. 1), thereby promoting adhesion of the bottom layer to the layer being deposited. In various embodiments, since the hot-air blower is an independent component separate from a CNC machine or a 3D printing device, the extrusion device 300 includes its own independent heating source. In this regard, the hot-air blower 342 may facilitate the adaptability of the extrusion device with a typical CNC machine without a heating mechanism, in accordance with various embodiments.

Although described herein as comprising a hot-air blower, any heating component capable of locally heating a material being deposited is within the scope of this disclosure. In various embodiments, by heating a layer below a layer being deposited, a system for heating the work environment during an additive manufacturing step (e.g., steps 102, 106, 108 of method 100 from FIG. 1) may be eliminated. Additionally, in accordance with various embodiments, by having a heating system 340 coupled to the housing assembly 330 of the extrusion device 300, the extrusion device 300 may be retrofitted onto a typical CNC machine and convert the CNC machine to a hybrid CNC machining/3D printing device (e.g., hybrid CNC machining/3D printing device 201 from FIG. 2A or hybrid CNC machining/3D printing device 203 from FIG. 2D or a 3D printing device 211 from FIG. 2E).

In various embodiments, the housing assembly 330 comprises a heat sink 332 and heater band(s)/elements 334. In various embodiments, the heater band(s)/elements 334 are configured to heat the material being extruded through the housing assembly 330 of the extrusion device 300 indirectly through the heat sink 332. For example, the heater band(s)/elements 334 may be electrically coupled to a controller (e.g., controller 208 from FIG. 2A). The controller may send a signal to the heater band(s)/elements 334 to begin electrical heating. The heater band(s)/elements 334 may electrically warm an external surface of the heat sink 332. The heat sink 332 may be any material known in the art. In various embodiments, the heat sink 332 may conduct heat generated from the heater band(s)/elements 334 and/or transfer the heat to the material being extruded through the extrusion device 300. In various embodiments, the heat band(s)/elements 334 may comprise a low conductive material to minimize the thermal transfer up the housing of the device to keep the material from melting in the hopper and clogging. In this regard, the material being layered or deposited may be heated during extrusion from the extrusion device 300 via the heater band(s)/elements 334 and heated after being layered or deposited via the heating system 340 during a layering and/or depositing step of method 100 from FIG. 1 (e.g., steps 102, 106, 108). In various embodiments, by heating during extrusion, the extrusion device 300 may facilitate bonding during the depositing and/or layering steps (e.g., steps 102, 106, 108 of method 100 from FIG. 1).

In various embodiments, the extrusion device 300 may further comprise a speed controller 370. The speed controller 370 may be electrically coupled to the drive motor 310. In various embodiments, the speed controller 370 is configured to vary an extrusion speed of the drive motor 310. In this regard, the speed controller 370 may be adjusted to either speed up or slow down an extrusion speed of the drive motor based on a desired application of the extrusion device 300. In various embodiments, the speed controller 370 may be in electrical communication with a controller (e.g., controller 208 from FIG. 2A) for a respective hybrid CNC machining/3D printing device.

In various embodiments, the housing assembly 330 may further comprise a thermocouple mount 336. The thermocouple mount 336 may be configured to receive a thermocouple mounted thereon as described further herein. A thermocouple may be configured to monitor an extrusion temperature for the material being disposed through the housing assembly during a layering and/or depositing step of method 100 from FIG. 1 (e.g., steps 102, 106, 108). In this regard, heater band(s)/elements 334 may be adjusted in response to measurements by a respective thermocouple to ensure the material is heated to a desired temperature during the extrusion process. In various embodiments, the thermocouple may be configured to be in electrical communication with a controller (e.g., controller 208 from FIG. 1).

Figure 4:
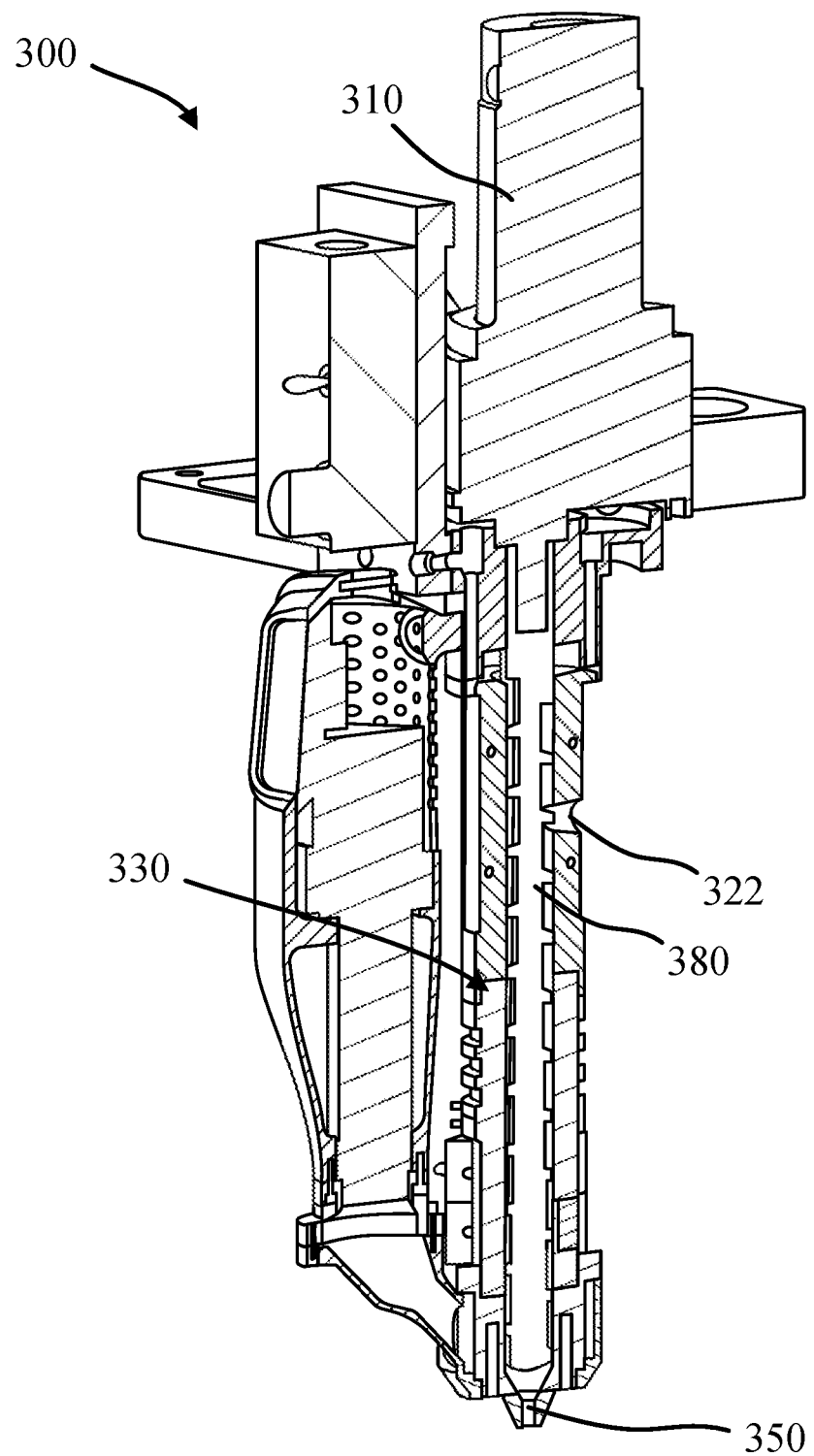
FIG. 4 illustrates a perspective cross-sectional view of an extrusion device, in accordance with various embodiments.

Referring now to FIG. 4, a perspective cross-sectional view of an extrusion device 300, in accordance with various embodiments, is illustrated. In various embodiments, the extrusion device 300 further comprises an auger 380 disposed in the housing assembly 330. The auger 380 may be operably coupled to the drive motor 310. In this regard, the auger 380 is configured to rotate about a centerline of the auger 380 by the drive motor 310. In various embodiments, by rotating the auger 380 about an axis defined by a centerline of the auger, a material may translate downward through the housing assembly 330 and out through the nozzle 350. In this regard, material may be fed through hopper outlet 322 into the housing assembly 330, the material may translate downward in response to auger 380 rotating about the centerline of the auger, and the material may be extruded out the nozzle 350, in accordance with various embodiments.

Figure 5:
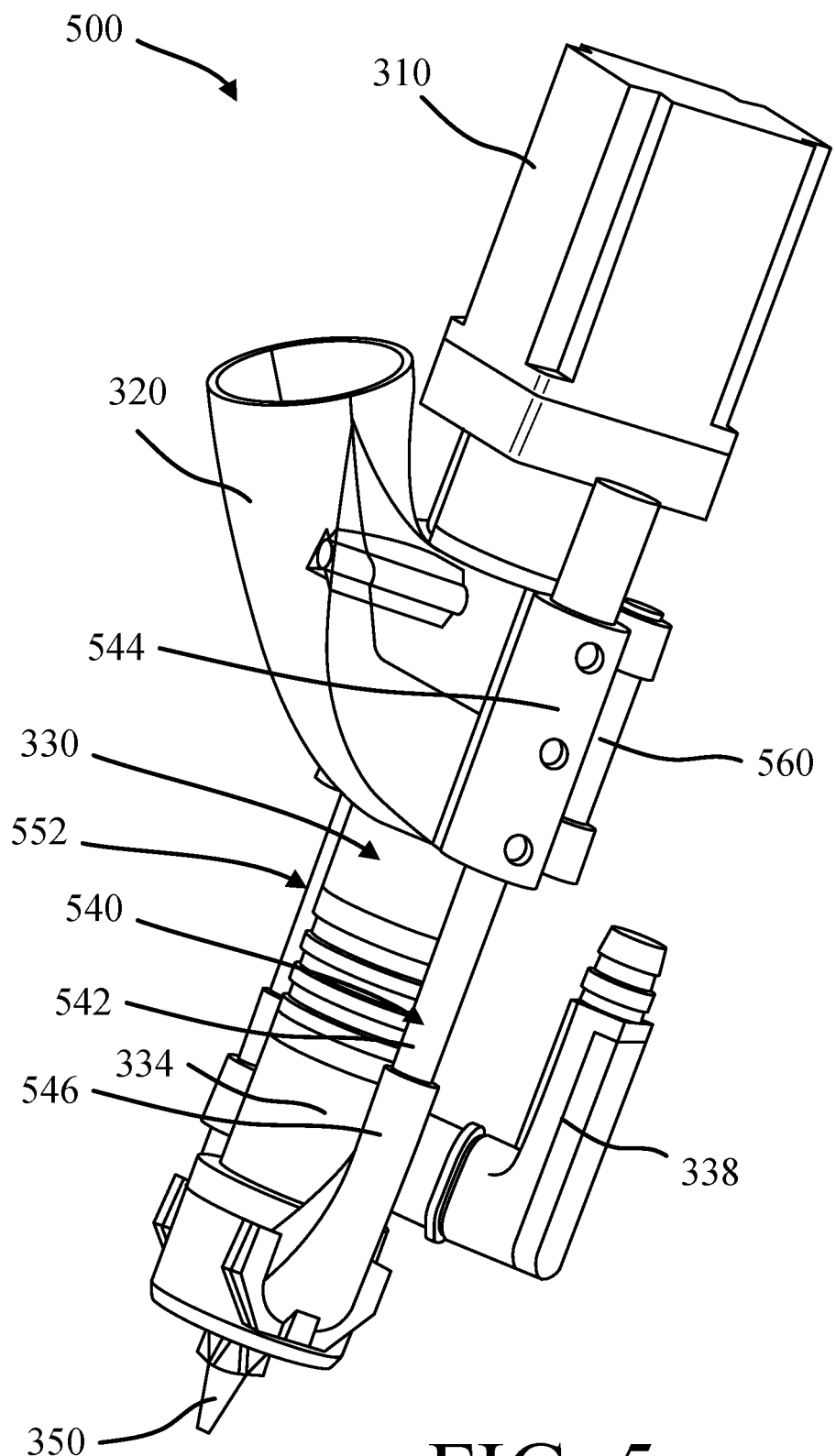
FIG. 5 illustrates a perspective view of an extrusion device, in accordance with various embodiments.

Referring now to FIG. 5, a perspective view of an extrusion device 500, in accordance with various embodiments, is illustrated. In various embodiments, the first extrusion unit 210, the second extrusion unit 220, and/or the third extrusion unit 230 may be in accordance with extrusion device 500. In various embodiments, the extrusion device 500 includes a drive motor 310, a hopper 320, a housing assembly 330, a heating system 540, and a nozzle 350. In various embodiments, the heating system 540 comprises a first hot-air blower 542 disposed radially outward from the housing assembly 330. In various embodiments, any combination of components from extrusion device 500 and extrusion device 300 is within the scope of this disclosure.

In various embodiments the first hot-air blower 542 is coupled to the housing assembly 330, disposed within a first heating housing 544 and configured to output hot-air through the first hot-air duct 546. The hot-air that is disposed through the hot-air duct may be configured to heat a layer of material below a layer being deposited during the layering step of method 100 from FIG. 1 (e.g., step 102), and/or heat a layer of material below a layer during a depositing step of method 100 from FIG. 1 (e.g., steps 102, 106, 108). In this regard, an output of the first hot-air duct 546 may be disposed circumferentially around the nozzle 350. Thus, the hot-air may directly contact a layer below a layer being deposited (e.g., during steps 102, 106, 108 of method 100 from FIG. 1) promoting adhesion of the bottom layer to the layer being deposited. In various embodiments, by heating a layer below a layer being deposited, a system that heats the work environment during an additive manufacturing step (e.g., steps 102, 106, 108 of method 100 from FIG. 1) may be eliminated. Additionally, in accordance with various embodiments, by having a heating system 540 coupled to the housing assembly 330 of the extrusion device 300, the extrusion device 300 may be retrofitted onto a typical CNC machine and convert the CNC machine to a hybrid CNC machining/3D printing device (e.g., hybrid CNC machining/3D printing device 201 from FIG. 2A or a hybrid CNC machining/3D printing device 203 from FIG. 2D or a 3D printing device 211 from FIG. 2E).

In various embodiments, the heating system 540 may further comprise a second hot-air blower 552. Although illustrated as comprising two hot-air blowers, any number of hot-air blowers is within the scope of this disclosure. For example, in accordance with various embodiments, the extrusion device 500 may comprise between 1 and 4 hot-air blowers, or more preferably, approximately 2 hot-air blowers. The second hot-air blower 552 may be in accordance with the first hot-air blower 542. In various embodiments, the second hot-air blower 552 may be disposed on an opposite side of the first hot-air blower 542. For example, the second hot-air blower 552 may be disposed approximately 180 degrees from the first hot-air blower 542 about a centerline of a respective auger of extrusion device 500.

In various embodiments, the extrusion device 500 further comprises a temperature sensor 560. The temperature sensor 560 may be coupled to the housing assembly 330 by any method known in the art, such as fasteners, or the like. The temperature sensor 560 may be in operable communication with a plenum within the housing assembly 330. In this regard, the temperature sensor 560 may monitor the temperature within the housing assembly 330 during operation of the extrusion device 500 (e.g., during a layering step 102 of method 100 from FIG. 1, and/or during a depositing step 106 and/or 108 of method 100 from FIG. 1).

In various embodiments, the extrusion device 500 further comprises an electrical connector 338 coupled to the heater band(s)/elements 334. The electrical connector 338 may be configured to be electrically coupled to a controller (e.g., controller 208 from FIG. 2A). In this regard, the heater band(s)/elements 334 may be programmable to maintain a constant temperature, a range of temperatures, or vary a temperature during a manufacturing process (e.g., method 100 from FIG. 1), in accordance with various embodiments.

Figure 6:
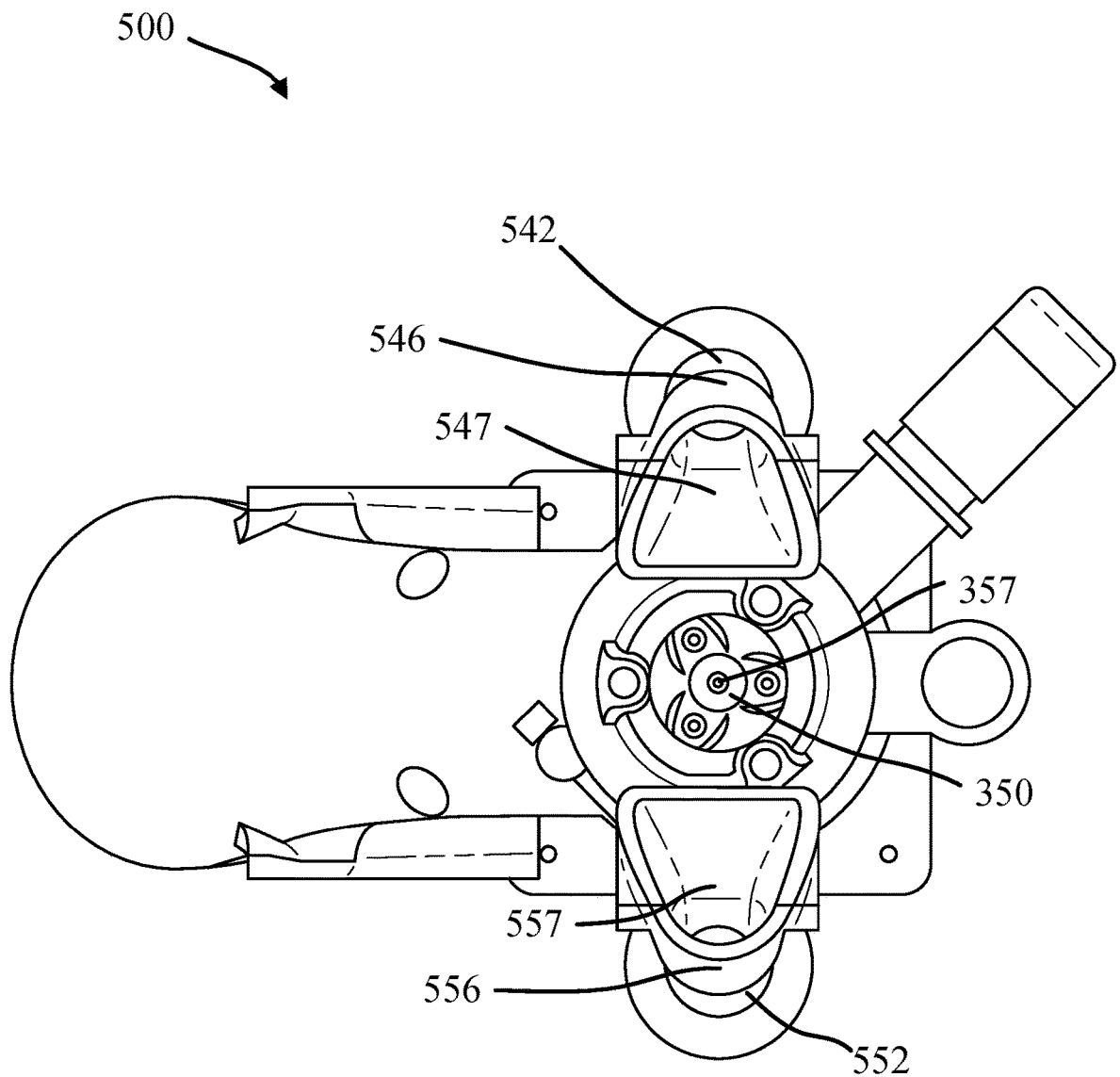
FIG. 6 illustrates a bottom view of an extrusion device, in accordance with various embodiments.

Referring now to FIG. 6, a bottom-up view of an extrusion device 500, in accordance with various embodiments, is illustrated. The extrusion device 500 may further comprise a first outlet 547 of the first hot-air blower 542 in fluid communication with the first hot-air duct 546. Similarly, the extrusion device 500 may further comprise a second outlet 557 of the second hot-air blower 552 in fluid communication with the second hot-air duct 556. The first outlet 547 and the second outlet 557 may be disposed radially outward from a nozzle outlet 357 of nozzle 350. In this regard, the heat that is disposed through the hot-air ducts 546, 556 may be configured to heat a layer of material below a layer being deposited during the layering step of method 100 from FIG. 1 (e.g., step 102), and/or heat a layer of material below a layer during a depositing step of method 100 from FIG. 1 (e.g., steps 102, 106, 108). Thus, the hot-air may directly contact a layer below a layer being deposited (e.g., during steps 102, 106, 108 of method 100 from FIG. 1) promoting adhesion of the bottom layer to the layer being deposited. In various embodiments, by heating a layer below a layer being deposited, a system that heats the work environment during an additive manufacturing step (e.g., steps 102, 106, 108 of method 100 from FIG. 1) may be eliminated.

Figure 7B:
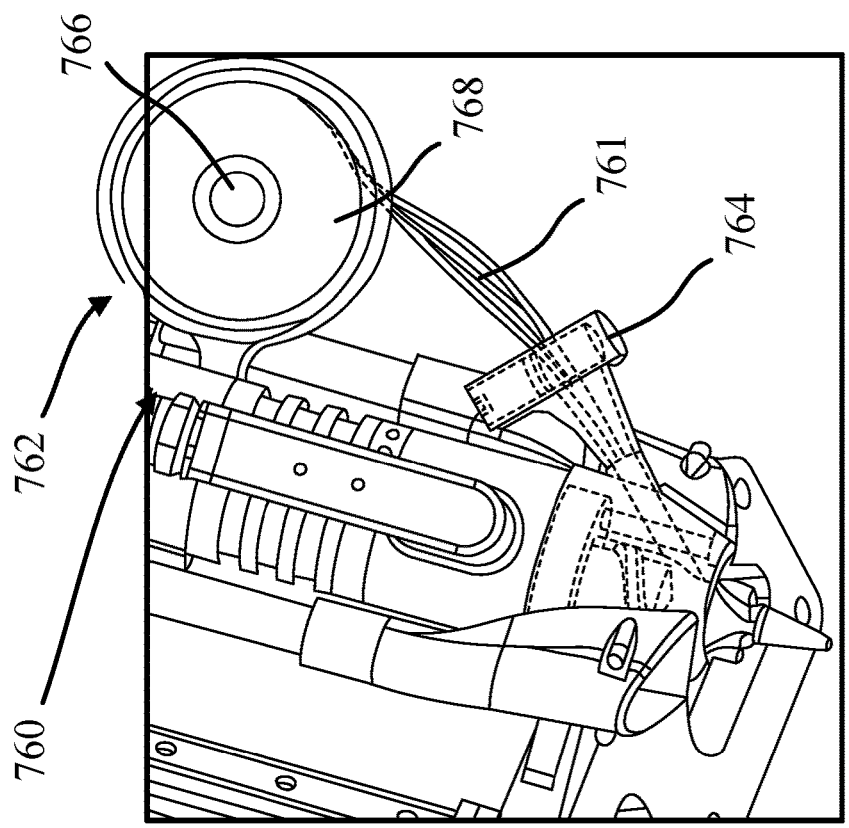
FIG. 7B illustrates a detail view of a spool feeder system for an extrusion device, in accordance with various embodiments.
Figure 7A:
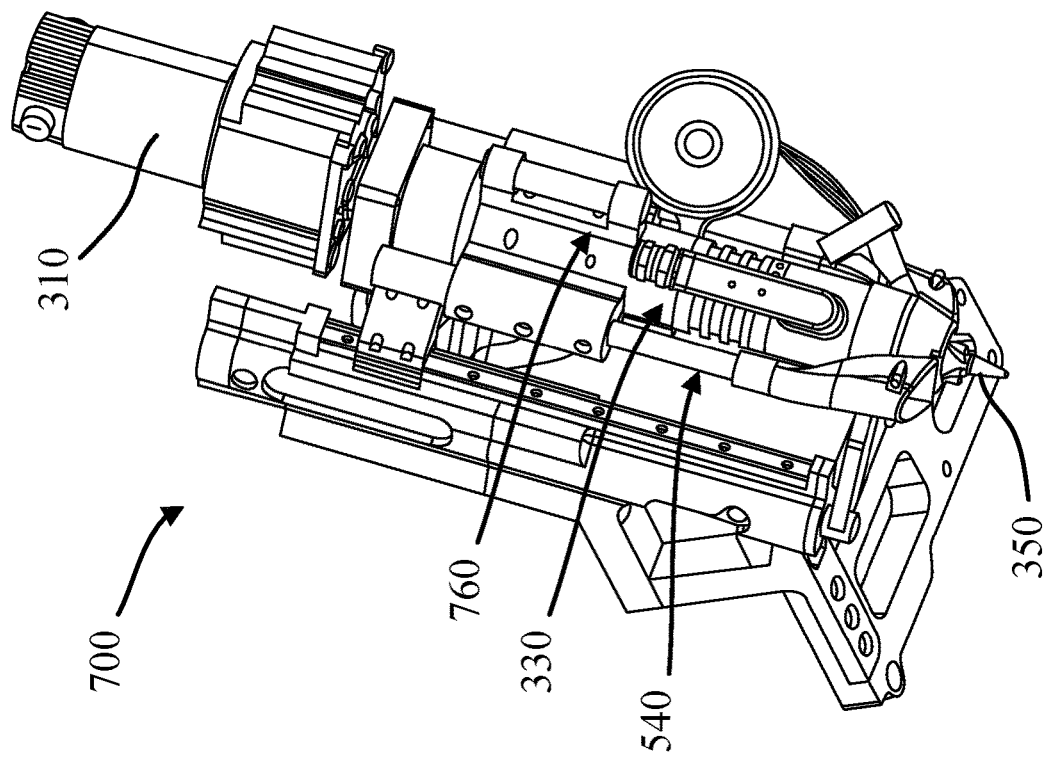
FIG. 7A illustrates an extrusion device having a spool feeder system, in accordance with various embodiments.

Referring now to FIG. 7A, a perspective view of an extrusion device 700, in accordance with various embodiments, is illustrated. In various embodiments, the first extrusion unit 210, the second extrusion unit 220, and/or the third extrusion unit 230 may be in accordance with extrusion device 700. In various embodiments, the extrusion device 700 includes a drive motor 310, a hopper 320 from FIGS. 3 and 5, a housing assembly 330, a heating system 540, a nozzle 350, and a spool feeder system 760. Although illustrated with heating system 540, the extrusion device 700 is not limited in this regard. For example, the extrusion device 700 may comprise the heating system 340 from FIG. 3, in accordance with various embodiments.

Referring now to FIG. 7B, a detail view of the spool feeder system 760 is illustrated, in accordance with various embodiments. The spool feeder system 760 comprises a spool 762 and a drive motor 764. The spool 762 is coupled to the housing assembly 330. In various embodiments, the spool 762 includes a shaft 766 and a wheel 768. The wheel 768 is configured to rotate about the shaft 766 in response to drive motor 764 driving a filament 761 toward the nozzle 350 to form an extruded bead and create a composite material (i.e., the first material of step 102 and the filament 761, the second material of step 106 and the filament 761, and/or the support material of step 108 and the filament). In this regard, any of the extrusion devices herein may be configured to include the spool feeder system 760 to facilitate a composite 3D printed component.

In various embodiments, the filament may comprise a silicon carbon fiber, such as that sold under the trademarks Nicalon™, Hi-Nicalon™, Hi-Nicalon™ Type S, or the like. The silicon carbide fiber may provide high strength, heat and corrosion resistance, and/or provide improved performance opportunities to ceramic, plastic, and/or metal matrices (e.g., CMC, PMC, MMC as described previously herein).

Figure 8C:
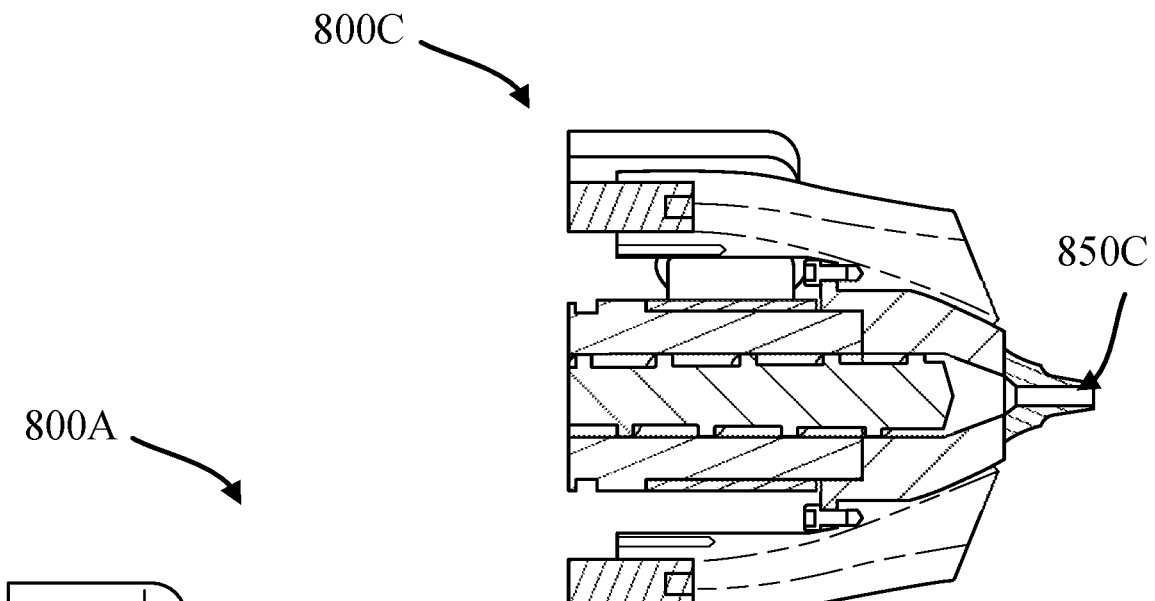
FIG. 8C illustrates a cross-sectional view of a portion of an extrusion device, in accordance with various embodiments.
Figure 8A:
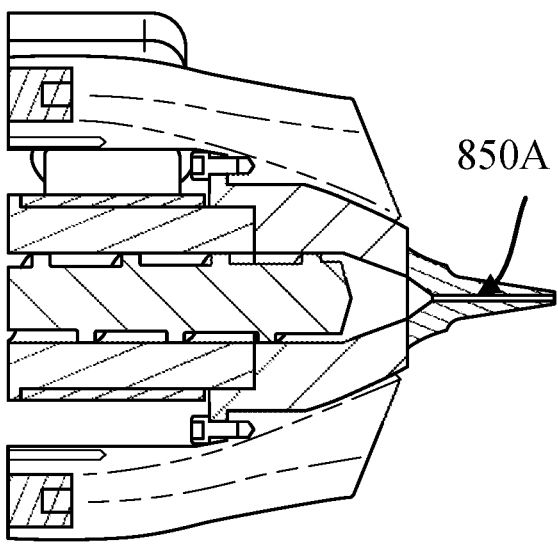
FIG. 8A illustrates a cross-sectional view of a portion of an extrusion device, in accordance with various embodiments.
Figure 8B:
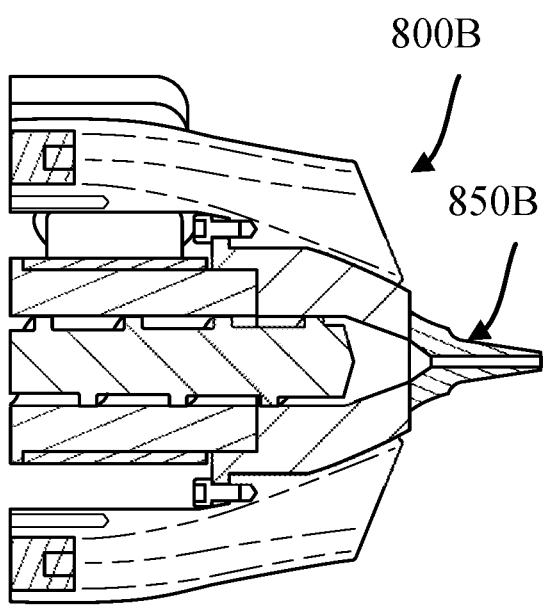
FIG. 8B illustrates a cross-sectional view of a portion of an extrusion device, in accordance with various embodiments.

Referring now to FIGS. 8A-8C, cross-sectional view of various extrusion units 800A, 800B, 800C are illustrated, in accordance with various embodiments. In various embodiments, a nozzle's diameter/shape may be sized and configured based on desired function of a respective extrusion unit. For example, the first extrusion unit 210 from FIG. 2A or 2F may comprise a large diameter nozzle (e.g., nozzle 850C from FIG. 8C) and be configured to bulk deposit a material during a layering step of method 100 from FIG. 1 (e.g., step 102). In various embodiments, the second extrusion unit 220 from FIGS. 2B and 2F may comprise a small nozzle (e.g., nozzle 850A from FIG. 8A) and be configured to deposit a fine particulate during a depositing step of method 100 from FIG. 1 (e.g., step 106). In various embodiments, the support material may be deposited through the third extrusion unit 230 from FIGS. 2B and 2F_through a medium diameter nozzle (e.g., nozzle 850B from FIG. 8B) during a depositing step of method 100 from FIG. 1 (e.g., step 108). In various embodiments, the support material may be deposited utilizing any diameter nozzle (e.g., nozzles 850A, 850B, 850C of FIGS. 800A-800C).

Referring now to FIGS. 9A-C, various views of a condensing/conforming tool 250 are illustrated, in accordance with various embodiments. In various embodiments, the condensing/conforming tool 250 comprises a plumbing system 910, a material forming apparatus 920, a fluid driving system 930, a damping system 940, an adapter 950, and a tip 960.

In various embodiments, the plumbing system 910 comprises a fluid conduit 912, a fluid inlet 914 and a coupling 916. The fluid conduit 912 is configured to route hot-air from the fluid inlet 914 through the fluid conduit 912 and out the tip 960. In this regard, as material forming apparatus 920 is condensing/conforming a pre-deposited material (e.g., after step 102, step 106, and/or step 108), the hot-air may soften the pre-deposited material and facilitate bonding with prior layers, in accordance with various embodiments. The coupling 916 is configured to couple to a heating system of a typical CNC machine. In this regard, the coupling 916 may be configured to removably couple to a heating system (e.g., coupling 918 in FIG. 9A of the hybrid CNC machining/3D printing device 201 from FIG. 2A, the hybrid CNC machining/3D printing device 203 from FIG. 2D, or the 3D printing device 211 from FIG. 2E).

In various embodiments, the material forming apparatus 920 comprises a sphere 922. Although illustrated as comprising a sphere, the present disclosure is not limited in this regard. For example, the material forming apparatus 920 could be various shapes, such as hemispherical, cylindrical, or the like. The material forming apparatus 920 extends at least partially through an outlet 962 of the tip 960. The material forming apparatus 920 may be coupled to a strut 942 of the damping system 940, in accordance with various embodiments. The damping system 940 is configured to facilitate damping of the material forming apparatus 920 during operation of the condensing/conforming tool 250. For example, the damping system 940 allows the material forming apparatus 920 to move axially along a central axis of the strut 942. In this regard, the damping system may compensate for form discrepancies when pressure is applied and/or prevent damage to a respective part or the hybrid CNC machining/3D printing device 201 from FIG. 2A, the hybrid CNC machining/3D printing device 203 from FIG. 2D, and/or the 3D printing device 211 from FIG. 2E during use, in accordance with various embodiments. In various embodiments, the damping system 940 may comprise a gas shock strut system, a spring loaded system, or the like.

In various embodiments, the fan 932 is configured to drive the hot-air from the fluid conduit 912 of plumbing system 910. In this regard, the fan 932 may rotate about an axis defined by the spindle 934, forcing air from the fluid conduit 912 via suction or the like. In various embodiments, the fan 932 may additionally pressurize the material forming apparatus 920, in accordance with various embodiments. In this regard, the fluid driving system 930 may be a dual purpose system (i.e., providing additional pressure for conforming the deposited material more efficiently and/or softening the deposited material by pulling hot-air from the fluid conduit 912 of the plumbing system 910.

In various embodiments, the fan 932 is configured to drive the hot-air from the fluid conduit 912 of plumbing system 910. In this regard, the fan 932 may rotate about an axis defined by the spindle 934, forcing from the fluid conduit 912 via suction or the like. In various embodiments, the fan 932 may additionally pressurize the material forming apparatus 920, in accordance with various embodiments. In this regard, the fluid driving system 930 may be a dual purpose system (i.e., providing additional pressure for conforming the deposited material more efficiently and/or softening the deposited material by pulling hot-air from the fluid conduit 912 of the plumbing system 910).

In various embodiments, the fluid driving system 930 comprises bearings 936. The bearing 936 may facilitate efficient rotation of the spindle 934 and the fan 932. In various embodiments, any type of bearings may be utilized for bearings 936, such as roller bearings, ball bearings, or the like. The present disclosure is not limited in this regard. The fan 932 is configured to rotate relative to housing 970. In this regard, the condensing/conforming tool 250 may further comprise a disengagement pin 972 coupled to the housing 970 that is configured to keep the housing 970 stationary during operation of the fluid driving system 930. For example, the disengagement pin 972 is configured to engage a receptacle in a tool holder of the hybrid CNC machining/3D printing device 201 from FIG. 2A, the hybrid CNC machining/3D printing device 203 from FIG. 2D, and/or the 3D printing device 211 from FIG. 2E as described further herein.

In various embodiments, the adapter 950 is coupled to a radially outer surface of the spindle 934. Although illustrated as being separate components, the adapter 950 may be monolithic with the spindle 934, in accordance with various embodiments. The adapter 950 is configured to operably couple a tool holder of the hybrid CNC machining/3D printing device 201 from FIG. 2A to the spindle 934. In this regard, the tool holder may be operably coupled to the controller 208 from FIG. 2A, and the controller 208 may be configured to drive the spindle 934, via operation of the tool holder, in accordance with various embodiments.

In various embodiments, the condensing/conforming tool 250 is adaptable to typical CNC machining tool holders. In this regard, the condensing/conforming tool 250 may be retrofit into any existing CNC machining tool drive system and be operated as described herein. The condensing/conforming tool 250 may facilitate smoother bonding between various layers during manufacturing of a 3D printed product (e.g., during method 100 from FIG. 1). As described further herein, the condensing/conforming tool 250 may be swapped out with a subtractive component 240 of a CNC machine or of a hybrid CNC machining/3D printing device 201 from FIG. 2A and/or a hybrid CNC machining/3D printing device 203 from FIG. 2D.

Figure 10:
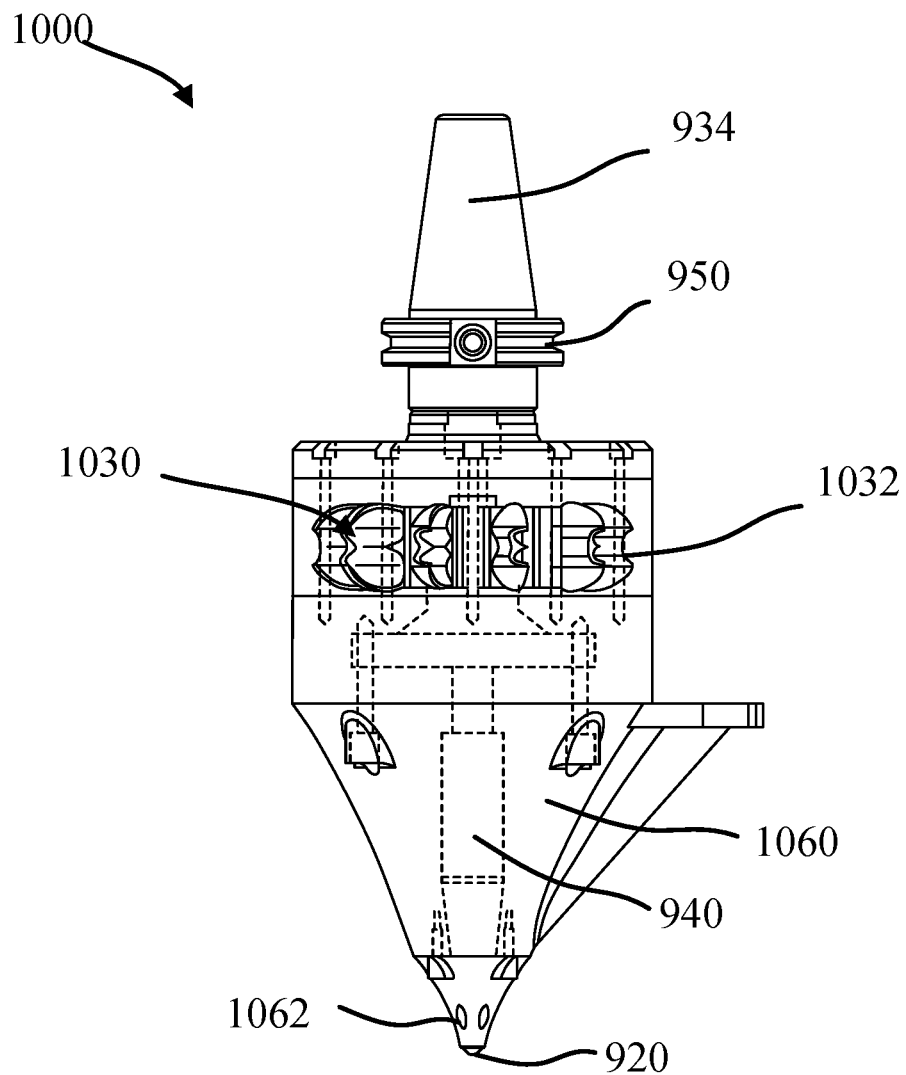
FIG. 10 illustrates a side view of a condensing/conforming tool, in accordance with various embodiments.
Figure 11A:
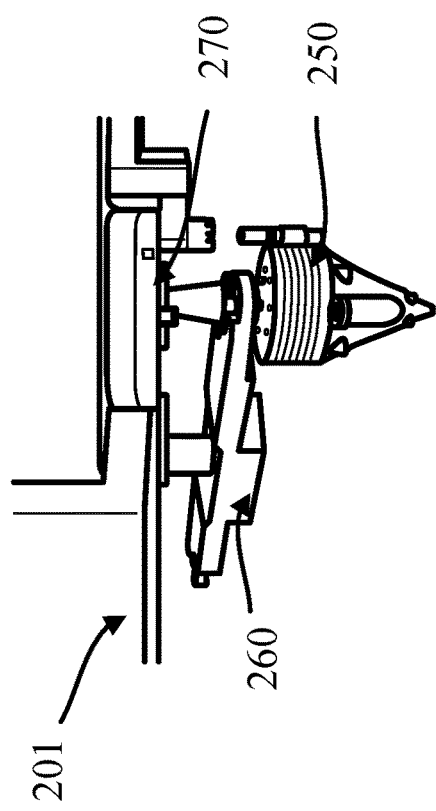
FIGS. 11A-D illustrate installation of a condensing/conforming tool in a tool holder of a CNC machine, in accordance with various embodiments.
Figure 11C:
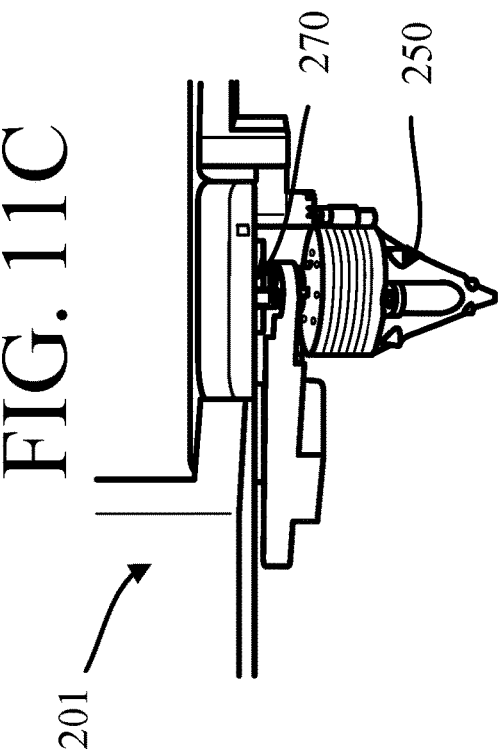
Figure 11B:
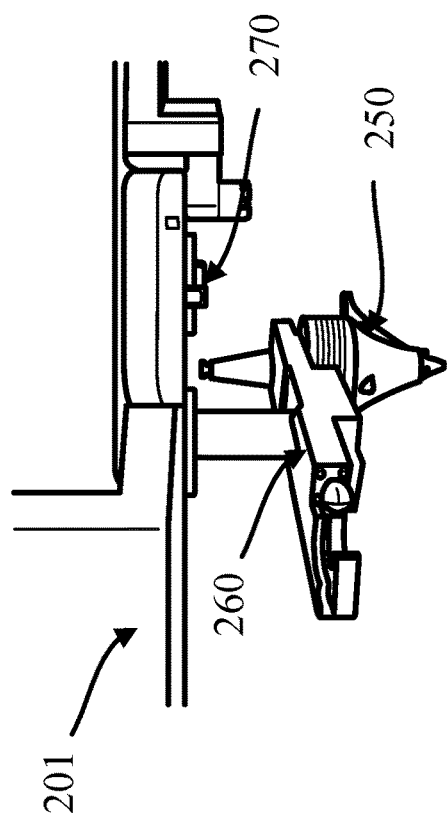
Figure 11D:
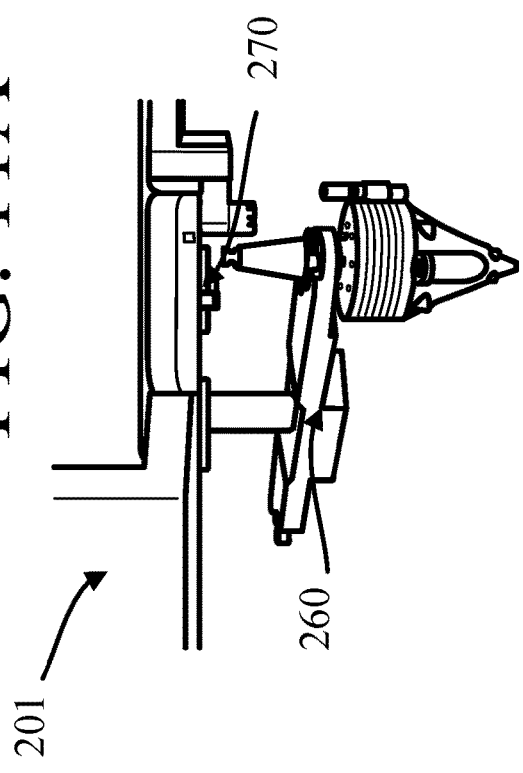
Figure 11E:
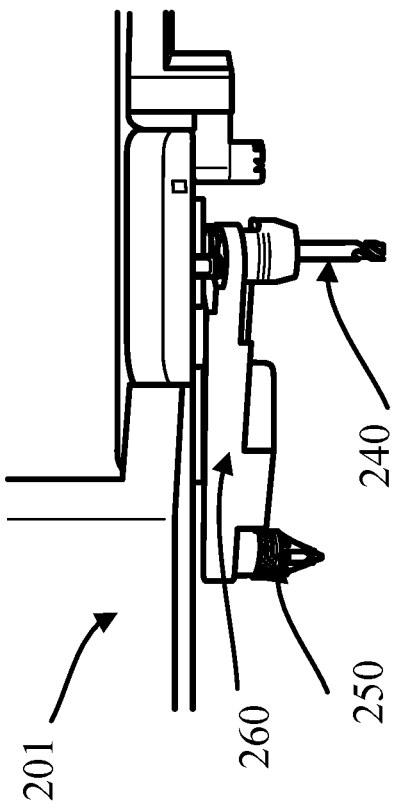
FIGS. 11E-H illustrate replacing the condensing/conforming tool with a subtractive component, in accordance with various embodiments.
Figure 11G:
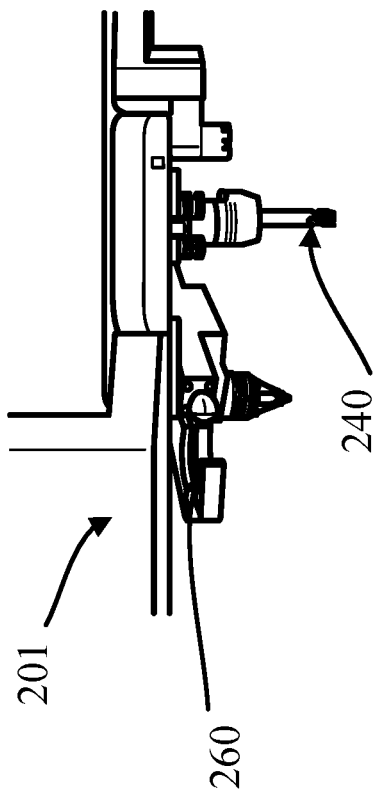
Figure 11F:
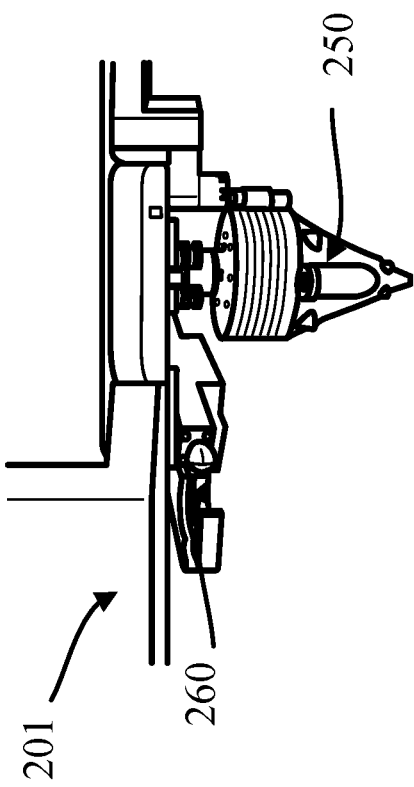
Figure 11H:
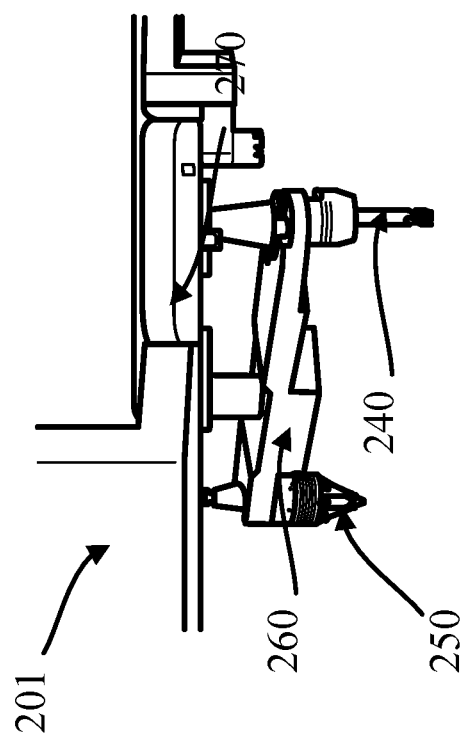

Referring now to FIG. 10, a side view of a condensing/conforming tool 1000 is illustrated, in accordance with various embodiments. In various embodiments, the condensing/conforming tool 1000 may comprise a plumbing system 910 from FIGS. 9A-C, a material forming apparatus 920, a fluid driving system 1030, a damping system 940, an adapter 950, and a nozzle 1060.

In various embodiments, the fluid driving system 1030 may comprise a turbine 1032. In various embodiments, the turbine 1032 may comprise a Pelton turbine design (i.e., the turbine 1032 may be configured to rotate irrespective of the spindle 934). For example, the turbine 1032 may be configured to rotate in response to compressed air blowing on a bucket of each turbine blade in the turbine 1032, in accordance with various embodiments.

In various embodiments, the nozzle 1060 comprises a plurality of fluid outlets 1062 disposed proximate the material forming apparatus 920. In various embodiments, the tip 960 may also comprise the plurality of fluid outlets 1062. The plurality of fluid outlets 1062 may be disposed radially outward from the material forming apparatus 920 and oriented along an axis defined by the spindle 934. In this regard, hot-air may be oriented towards a material that is being condensed or conformed in accordance with step 103 of method 100 from FIG. 1.

With reference now to FIGS. 11A-H, a condensing/conforming tool 250 being installed (FIGS. 11A-E) in tool holder 1002 of the hybrid CNC machining/3D printing device 201 and being replaced with a subtractive component 240 (FIGS. 11F-H) are illustrated, in accordance with various embodiments. In various embodiments, the hybrid CNC machining/3D printing device 201 comprises an arm 260. The arm 260 is configured to grab a respective tool (e.g., the subtractive component 240 or the condensing/conforming tool 250) from a tool storage area, rotate the tool to a spindle taper 270, and couple the tool to the spindle taper 270, or a spindle 205 from FIG. 2A, in accordance with various embodiments. The arm 260 is in operable communication with the controller 208 from FIG. 2A. The spindle taper 270 may comprise a receptacle configured to receive the spindle of the condensing/conforming tool 250. In this regard, the spindle taper 270 may comprise a drive motor configured to rotate the spindle as described further herein.

Figure 12:
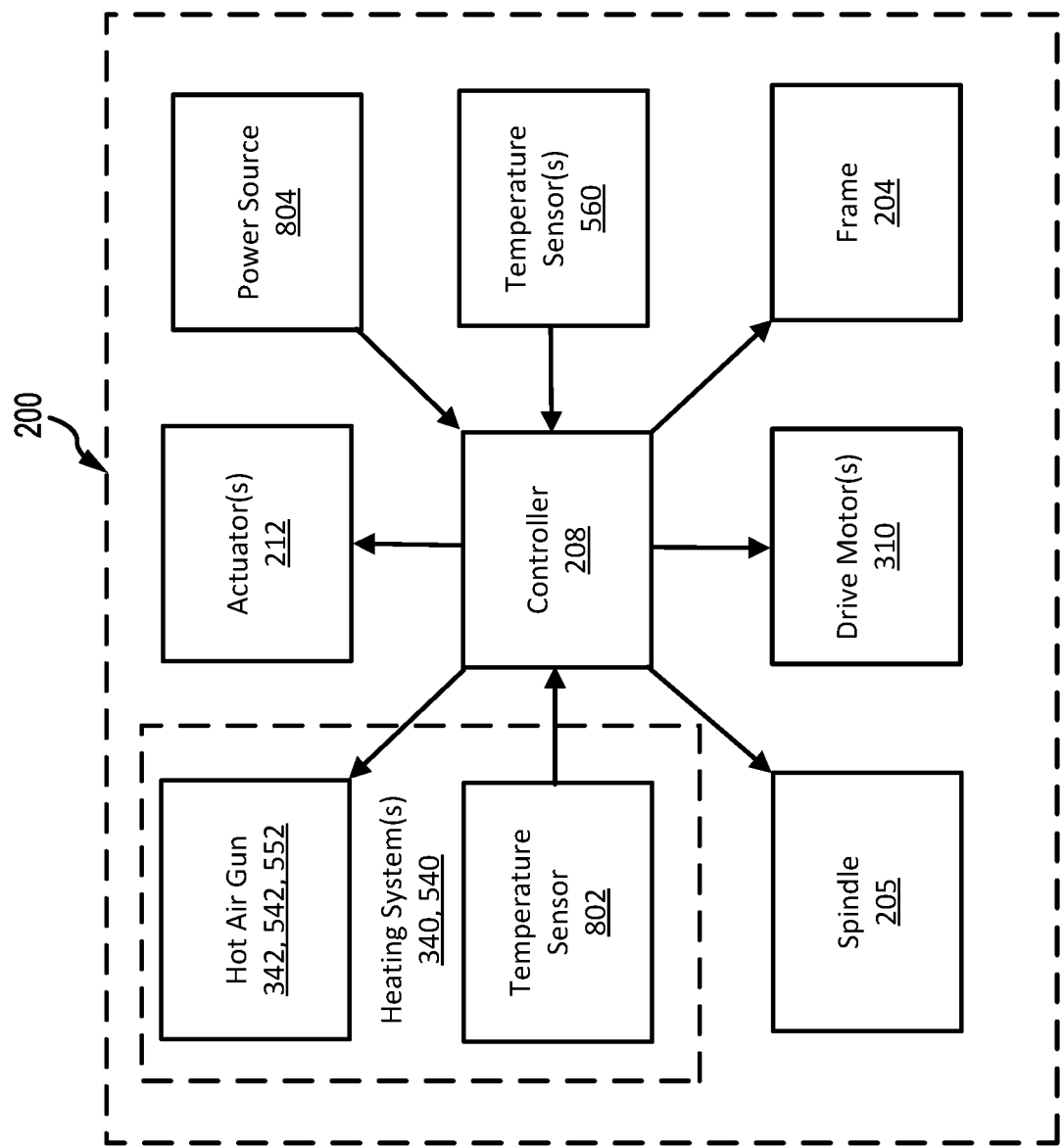
FIG. 12 illustrates a schematic block diagram of a manufacturing system, in accordance with various embodiments.

Referring now to FIG. 12, a schematic block diagram of a manufacturing system 200 from FIG. 2 is illustrated, in accordance with various embodiments. Manufacturing system 200 includes a controller 208 in electrical communication with the frame 204, spindle 205, the drive motor 310 of each extrusion unit from FIG. 2A (e.g., extrusion units 210, 220, 230), the heating system 340, 540 of each extrusion unit from FIG. 2A (e.g., extrusion units 210, 220, 230), the actuator 212 of each extrusion unit from FIG. 2A (e.g., extrusion units 210, 220, 230), a power source 804, and/or the temperature sensor 560 from each extrusion unit from FIG. 2A (e.g., extrusion units 210, 220, 230). In various embodiments a CNC tool (e.g., subtractive component 240, condensing/conforming tool 250, or the like) may be operable by the controller through the spindle 205 from FIG. 2A. In this regard, controller 208 may be configured to command spindle 205 to rotate, which in turn may rotate a spindle of a respective CNC tool (e.g., subtractive component 240, condensing/conforming tool 250, or the like). Although described herein with respect to hybrid CNC machining/3D printing device 201 from FIG. 2A, the system 200 is also applicable to the hybrid CNC machining/3D printing device 203 from FIG. 2D and the 3D printing device 211 from FIG. 2E except as otherwise provided herein.

In various embodiments, controller 208 may be integrated into a microcontroller disposed within the hybrid CNC machining/3D printing device 201 from FIG. 2A. In various embodiments, controller 208 may be configured as a central network element or hub to access various systems and components of manufacturing system 200. Controller 208 may comprise a network, computer-based system, and/or software components configured to provide an access point to various systems and components of manufacturing system 200. In various embodiments, controller 208 may comprise a processor. In various embodiments, controller 208 may be implemented in a single processor. In various embodiments, controller 208 may may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 208 may comprise a processor configured to implement various logical operations in response to execution of instructions, for example, instructions stored on a non-transitory, tangible, computer-readable medium configured to communicate with controller 208. In various embodiments, the power source 804 may comprise a battery, an electrical outlet, or the like.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the heating system 340, 540 comprises at least one hot-air blower (e.g., hot-air blowers 342, 542, 552) and at least one temperature sensor 802. In various embodiments the heating system 340, 540 may comprise a temperature sensor for each hot-air blower. In this regard, an output temperature of each hot-air blower may be monitored by controller 208 and a temperature of the respective hot-air blower may be adjusted in response to the monitoring by the controller 208.

In various embodiments, the controller 208 may be configured to turn on the CNC tool (e.g., subtractive component 240, condensing/conforming tool 250, or the like) through spindle 205 disposed in frame 204 of FIG. 2A in response to completing a layering step of method 100 from FIG. 1 (e.g., step 102 from method 100). In various embodiments, the controller 208 may be configured to transition from a first CNC tool to a second CNC tool (e.g., from condensing/conforming tool 250 to subtractive component 240 or vice versa). In this regard, in response to completing step 103 of method 100 from FIG. 1, the controller 208 may swap out the condensing/conforming tool 250 to the subtractive component 240 as shown in FIGS. 11A-H, in accordance with various embodiments. In this regard, when a subtractive step begins in method 100 (e.g., step 104), the subtractive component 240 may be turned on and the spindle 205 may be translated based on a desired specification for a respective 3D component based on what needs to be removed from the rough shape produced in the layering step (e.g., step 102 of method 100 from FIG. 1.

In various embodiments, a drive motor 310 for each extrusion unit (e.g., first extrusion unit 210, second extrusion unit 220, and/or third extrusion unit 230 from FIG. 2A) may be in electrical, or wireless, communication with the controller 208. In this regard, based on which step of method 100 the manufacturing system 200 is on, a respective drive motor 310 may be turned on. For example, during a layering step (e.g., step 102), a drive motor 310 of the first extrusion unit 210 may be turned on and the spindle 205 may translate based on a desired rough shape of the respective 3D component to be printed. Similarly, during a depositing step (e.g., steps 102, 106, 108) a drive motor 310 of the second extrusion unit 220 or the third extrusion unit 230 may be turned on and the spindle 205 may be translated based on the desired depositing locations for the respective support material or finer material.

In various embodiments, the controller 208 is configured to translate actuator 212 of a respective extrusion unit (e.g., first extrusion unit 210, second extrusion unit 220, and/or third extrusion unit 230). In this regard, in accordance with various embodiments, during a layering or depositing step (e.g., steps 102, 106, 108 of method 100 from FIG. 1), the controller 208 may command the actuator 212 of a respective extrusion unit (e.g., extrusion units 210, 220, 230 from FIG. 2A) to translate based on a desired specification of a respective 3D component being manufactured.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

I claim:

1. A condensing device for use in a 3D printing system, the condensing device comprising:
   a first spindle taper adaptable to be operably coupled to a spindle of a computer numerical control (CNC) machining device;
   a tip comprising an aperture disposed at a most distal end of the tip and at least partially defining a longitudinal axis;
   a housing coupled to the tip;
   an air driving system disposed between the first spindle taper and the tip the air driving system configured to route air towards an air outlet disposed proximate the tip; and
   a material forming apparatus disposed at least partially within the tip and protruding at least partially outward through the aperture, the material forming apparatus configured to conform a pre-deposited material;
   wherein the air driving system comprises a turbine, and wherein the turbine is configured to rotate in response to the air blowing on a bucket of each blade of the turbine.

2. The condensing device of claim 1, further comprising a plumbing system configured to couple to a heating system.

3. The condensing device of claim 2, wherein the plumbing system is configured to receive hot-air from the heating system during operation of the condensing device via the CNC machining device.

4. The condensing device of claim 1, further comprising a damping system coupled to the material forming apparatus.

5. The condensing device of claim 4, wherein the damping system comprises a strut.

6. The condensing device of claim 1, wherein the turbine is configured to rotate relative to the housing.

7. The condensing device of claim 1, further comprising a damping system comprising a strut, wherein the material forming apparatus is coupled to the strut.

8. The condensing device of claim 7, wherein the damping system is configured to dampen the material forming apparatus during operation of the condensing device.

9. The condensing device of claim 7, wherein the damping system is configured to allow the material forming apparatus to move axially along a central axis of the strut during operation of the condensing device.

10. The condensing device of claim 1, further comprising a plumbing system disposed at least partially within the housing, wherein the plumbing system comprises the air outlet, an air inlet, and a conduit extending from the air outlet to the air inlet.

11. The condensing device of claim 10, further comprising a coupling disposed proximate the air inlet.

12. The condensing device of claim 11, wherein the coupling is configured to removably couple to a heating system of a hybrid CNC machining/3D printing device with the 3D printing system.

13. The condensing device of claim 1, wherein the air driving system comprises a fan configured to force the air through the air outlet.

14. The condensing device of claim 13, wherein the fan is configured to direct the air through the housing and out the air outlet during operation of the condensing device.

15. The condensing device of claim 14, further comprising bearings configured to facilitate rotation of the first spindle taper and the fan.

16. The condensing device of claim 15, wherein the fan rotates relative to the housing.

17. The condensing device of claim 1, wherein the turbine is configured to receive the air from the 3D printing system.

18. The condensing device of claim 1, wherein the air is heated and oriented towards the pre-deposited material through the air outlet during operation of the condensing device.

19. The condensing device of claim 1, further comprising a disengagement pin coupled to the housing, the disengagement pin configured to keep the housing in a stationary state during operation of the air driving system.

\* \* \* \* \*